US011313103B2

(12) United States Patent
Mizutani et al.

(10) Patent No.: US 11,313,103 B2
(45) Date of Patent: Apr. 26, 2022

(54) WORK VEHICLE

(71) Applicant: Hitachi Construction Machinery Co., Ltd., Tokyo (JP)

(72) Inventors: Keishi Mizutani, Hyogo (JP); Ryousuke Matsutani, Hyogo (JP); Shinichiro Tanaka, Hyogo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 166 days.

(21) Appl. No.: 16/641,484

(22) PCT Filed: Mar. 22, 2019

(86) PCT No.: PCT/JP2019/012008
§ 371 (c)(1),
(2) Date: Feb. 24, 2020

(87) PCT Pub. No.: WO2019/182090
PCT Pub. Date: Sep. 26, 2019

(65) Prior Publication Data
US 2021/0164196 A1 Jun. 3, 2021

(30) Foreign Application Priority Data
Mar. 22, 2018 (JP) .............................. JP2018-055090

(51) Int. Cl.
*B60T 17/22* (2006.01)
*E02F 9/20* (2006.01)
(Continued)

(52) U.S. Cl.
CPC ............ *E02F 9/2083* (2013.01); *B60T 13/68* (2013.01); *B60T 17/221* (2013.01);
(Continued)

(58) Field of Classification Search
CPC ...... E02F 9/2083; B60T 13/22; B60T 17/221; B60T 13/68; B60T 2270/402; B60T 2270/403
See application file for complete search history.

(56) References Cited

U.S. PATENT DOCUMENTS 8,495,870 B2 * 7/2013 Sumiyoshi ............ E02F 9/2235
60/444
2013/0004279 A1 1/2013 Naito et al.

FOREIGN PATENT DOCUMENTS

JP 4-133850 A 5/1992
JP 2001-158342 A 6/2001
(Continued)

OTHER PUBLICATIONS

International Search Report (PCT/ISA/210) issued in PCT Application No. PCT/JP2019/012008 dated Jun. 18, 2019 with English translation (two (2) pages).
(Continued)

*Primary Examiner* — F Daniel Lopez
(74) *Attorney, Agent, or Firm* — Crowell & Moring LLP

(57) ABSTRACT

A work vehicle provided with a loading hydraulic circuit (A), including at least a main hydraulic pump (31), a lift arm cylinder (8) and a control valve (32), an auxiliary hydraulic pump (31), a negative parking brake device (PB), and a parking brake releasing hydraulic circuit (B2), in which the vehicle includes: a loading operation hydraulic circuit (B1) located upstream of the parking brake releasing hydraulic circuit; an emergency flow path (80) for supplying the pressure oil discharged from the auxiliary hydraulic pump to the parking brake device through the loading operation hydraulic circuit in an emergency; and a valve unit (81) located in the emergency flow path. If the pressure of the parking brake releasing hydraulic circuit is lower than the
(Continued)

brake release pressure to release the braking state of the parking brake device, the valve unit is switched to the communicating position.

4 Claims, 17 Drawing Sheets

(51) Int. Cl.
  *E02F 9/22* (2006.01)
  *B60T 13/68* (2006.01)
(52) U.S. Cl.
  CPC ....... *E02F 9/2292* (2013.01); *B60T 2270/402* (2013.01); *B60T 2270/403* (2013.01)

(56) References Cited

FOREIGN PATENT DOCUMENTS

JP        2008-137561 A    6/2008
JP          5143311 B2    2/2013

OTHER PUBLICATIONS

Japanese-language Written Opinion (PCT/ISA/237) issued in PCT Application No. PCT/JP2019/012008 dated Jun. 18, 2019 (four (4) pages).

\* cited by examiner

FIG. 5

| CONDITION | JUDGEMENT CONDITION ||||||| CONTROL COMMAND |
|---|---|---|---|---|---|---|---|
| | DIRECTIONAL SOLENOID VALVE 71 | PRESSURE SENSOR 76 (P3) | PRESSURE SENSOR 75 (P2) | DIRECTIONAL SOLENOID VALVE 61 | PRESSURE SENSOR 63 (P1) | PRESSURE SENSOR 23b (P0) | DIRECTIONAL SOLENOID VALVE 81 |
| CONDITION 1 | ON | NORMAL PRESSURE | NORMAL PRESSURE | - | - | - | OFF |
| CONDITION 2 | ON | NORMAL PRESSURE | LOW PRESSURE | - | - | - | OFF |
| CONDITION 3 | ON | LOW PRESSURE | LOW PRESSURE | ON | NORMAL PRESSURE | NORMAL PRESSURE | ON |
| CONDITION 4 | ON | LOW PRESSURE | LOW PRESSURE | - | - | LOW PRESSURE | OFF |
| CONDITION 5 | ON | LOW PRESSURE | - | ON | LOW PRESSURE | NORMAL PRESSURE | ON |
| CONDITION 6 | - | NORMAL PRESSURE | LOW PRESSURE | ON | LOW PRESSURE | - | ON |
| CONDITION 7 | ON | LOW PRESSURE | LOW PRESSURE | - | - | NORMAL PRESSURE | OFF |

FIG. 15

| CONDITION | JUDGEMENT CONDITION | | | | | | CONTROL COMMAND | |
|---|---|---|---|---|---|---|---|---|
| | DIRECTIONAL SOLENOID VALVE 71 | PRESSURE SENSOR 76 (P3) | PRESSURE SENSOR 75 (P2) | DIRECTIONAL SOLENOID VALVE 61 | PRESSURE SENSOR 63 (P1) | PRESSURE SENSOR 23b (P0) | DIRECTIONAL SOLENOID VALVE 84 | DIRECTIONAL SOLENOID VALVE 77 |
| CONDITION 11 | ON | NORMAL PRESSURE | NORMAL PRESSURE | - | - | - | OFF | OFF |
| CONDITION 12 | ON | NORMAL PRESSURE | LOW PRESSURE | - | - | - | ON | ON |
| CONDITION 13 | ON | LOW PRESSURE | LOW PRESSURE | ON | NORMAL PRESSURE | NORMAL PRESSURE | ON | ON |
| CONDITION 14 | ON | LOW PRESSURE | LOW PRESSURE | - | - | LOW PRESSURE | OFF | OFF |
| CONDITION 15 | ON | LOW PRESSURE | LOW PRESSURE | - | - | NORMAL PRESSURE | ON | ON |
| CONDITION 16 | ON | NORMAL PRESSURE | LOW PRESSURE | ON | LOW PRESSURE | NORMAL PRESSURE | OFF | OFF |

WORK VEHICLE

TECHNICAL FIELD

The present invention relates to work vehicles which are typified, for example, by wheel loaders.

BACKGROUND ART

As the background art in this technical field, for example, Patent Literature 1 describes the structure of "a parking brake hydraulic circuit which includes: an accumulator with a hydraulic oil accumulated therein; an electromagnetic valve for supplying or stopping the hydraulic oil from the accumulator; and an emergency release valve for connecting a parking brake to a hydraulic line from the electromagnetic valve and releasing the parking brake". According to Patent Literature 1, if the hydraulic oil is not supplied to the parking brake for some reason, the hydraulic oil from the accumulator can be supplied to the parking brake through the emergency release valve and thus the parking brake can be forcibly released.

CITATION LIST

Patent Literature

PATENT LITERATURE 1: Japanese Patent No. 5143311

SUMMARY OF INVENTION

Technical Problem

However, in Patent Literature 1, whether the parking brake can be forcibly released or not depends on the accumulation state of the accumulator, so it may happen that the parking brake cannot be forcibly released in an emergency.

The present invention has been made in view of the above circumstances and an object thereof is to provide a work vehicle which can release the parking brake more reliably.

Solution to Problem

In order to achieve the above object, a typical work vehicle according to the present invention includes: a main hydraulic pump which is driven by an engine; a lift arm cylinder which extends and retracts by a delivery pressure discharged from the main hydraulic pump; a control valve which switches the moving direction of the lift arm cylinder; a loading hydraulic circuit which includes at least the main hydraulic pump, the lift arm cylinder, and the control valve; an auxiliary hydraulic pump which is provided separately from the main hydraulic pump and driven by the engine; a negative parking brake device which releases the braking state by supply of pressure oil discharged from the auxiliary hydraulic pump; and a parking brake releasing hydraulic circuit which supplies the pressure oil discharged from the auxiliary hydraulic pump to the parking brake device, in which the vehicle has: a loading operation hydraulic circuit located upstream of the parking brake releasing hydraulic circuit; an emergency flow path for supplying the pressure oil discharged from the auxiliary hydraulic pump to the parking brake device through the loading operation hydraulic circuit in an emergency; and a valve unit which is located in the emergency flow path and can be switched to a communicating position to communicate the emergency flow path or a shutoff position to shut off the emergency flow path. If the pressure in the parking brake releasing hydraulic circuit is lower than the brake release pressure to release the braking state of the parking brake device, the valve unit is switched to the communicating position.

Advantageous Effects of Invention

According to the present invention, the parking brake device mounted in a work vehicle can be released more reliably. The further objects, elements, and effects will more fully appear from the description of the embodiment mentioned below.

BRIEF DESCRIPTION OF DRAWINGS

FIG. 5 is a diagram which shows the judgement conditions to send an ON/OFF command to a directional solenoid valve 81.

FIG. 15 is a diagram which shows the judgement conditions to send an ON/OFF command to a directional solenoid valve 84 and a directional solenoid valve 77.

DESCRIPTION OF EMBODIMENT

Next, various embodiments of the wheel loader as an example of the work vehicle according to the present invention will be described referring to drawings. In the embodiments, the same elements are designated by the same reference signs and repeated description thereof is omitted.

First Embodiment

Figure 1:
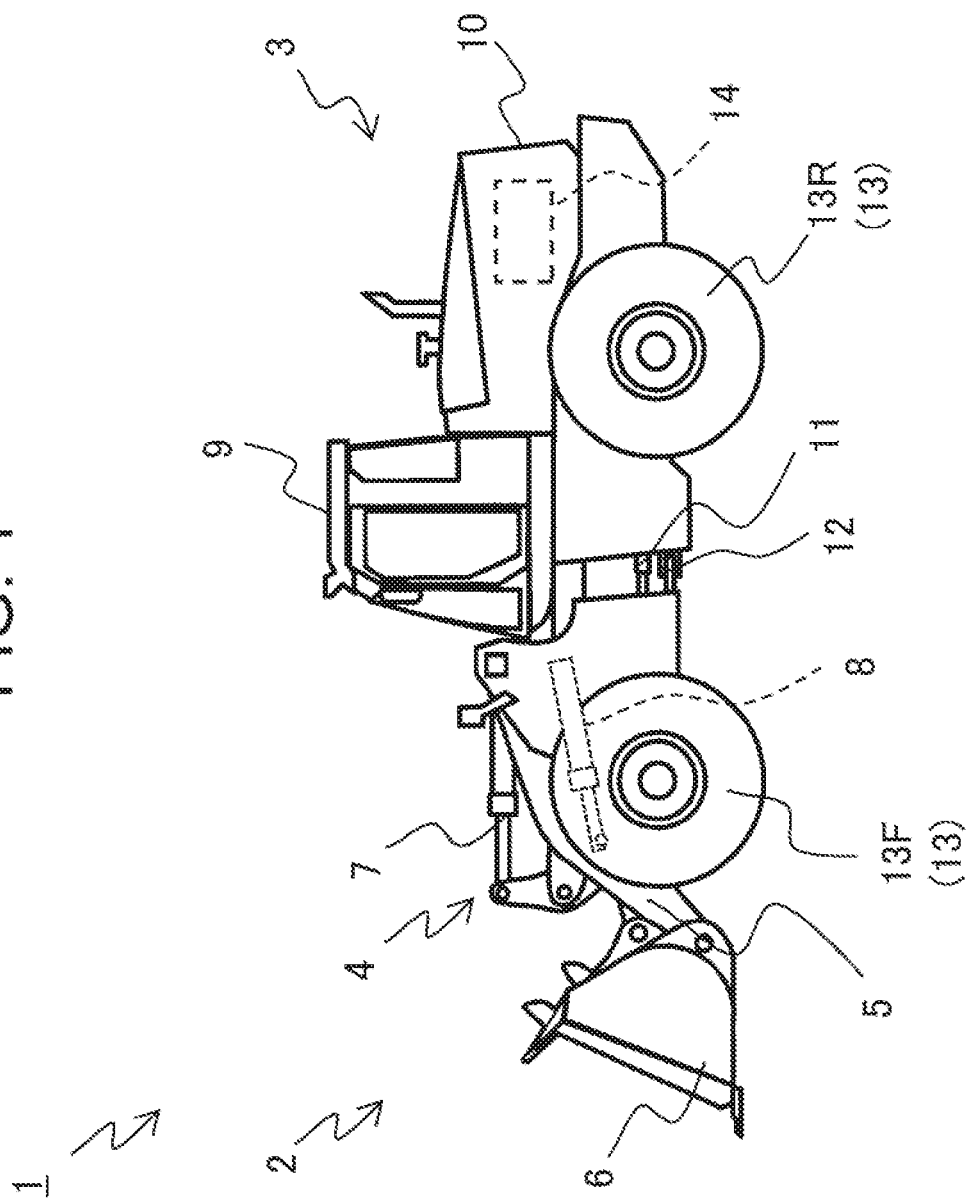
FIG. 1 is a side view of a wheel loader 1 according to the first embodiment of the present invention.

FIG. 1 is a side view of a wheel loader 1 according to the first embodiment of the present invention. The wheel loader 1 (equivalent to the "work vehicle" in the present invention) is constituted by: a front frame (vehicle body) 2 having a lift arm 5, a bucket 6, and front wheels 13F; and a rear frame (vehicle body) 3 having a cab 9, a machine room 10, and rear wheels 13R. An engine 14 is installed in the machine room 10. The front wheels 13F and the rear wheels 13R are also collectively referred to as the "wheels 13".

The lift arm 5 is vertically rotated (elevated) by driving lift arm cylinders 8 and the bucket 6 is vertically rotated (dumping or crowding) by driving the bucket cylinder 7. The lift arm 5, lift arm cylinders 8, bucket 6, and bucket cylinder 7 constitute a front working device 4. The front frame 2 and the rear frame 3 are rotatably coupled to each other by a center pin 12 and the front frame 2 is flexed left and right with respect to the rear frame 3 by extension and retraction of a pair of left and right steering cylinders 11.

A torque converter and a transmission, which are not shown in the figure, are connected to the output axis of the engine 14. The rotation of the engine 14 is transmitted to the transmission through the torque converter. The speed of the rotation of the output axis of the torque converter is changed by the transmission. The rotation after the speed change is transmitted to the wheels 13 through a propeller shaft and an axle so that the wheel loader 1 travels.

Figure 2:
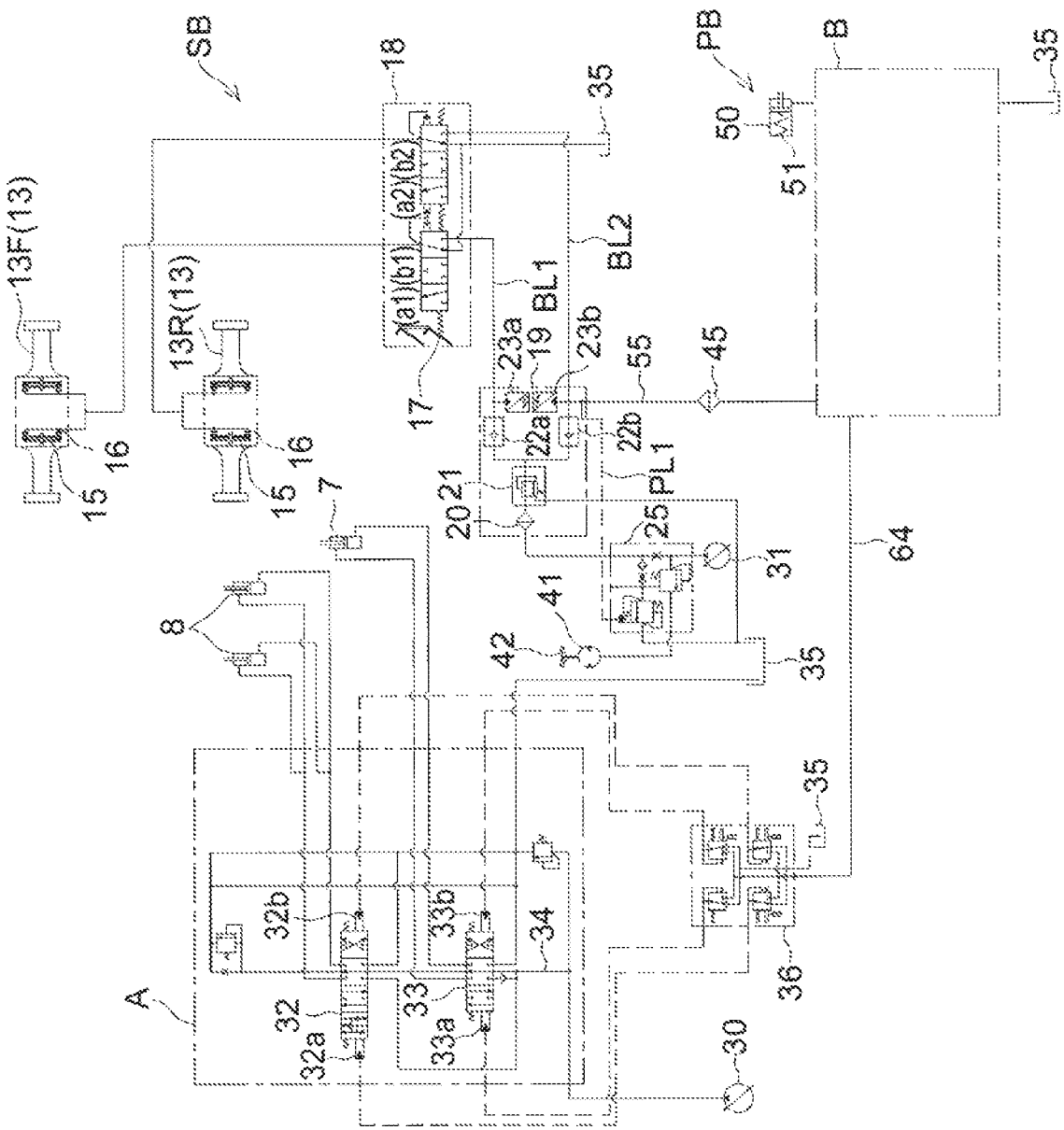
FIG. 2 is a schematic configuration diagram of the hydraulic drive circuit of the wheel loader 1 shown in FIG. 1.

FIG. 2 is a schematic configuration diagram of the hydraulic drive circuit of the wheel loader 1 shown in FIG. 1. As shown in FIG. 2, the wheel loader 1 mainly includes a main pump 30 (equivalent to the "main hydraulic pump" in the present invention), an accessory pump 31 (equivalent to the "auxiliary hydraulic pump" in the present invention), a loading hydraulic circuit A for driving the lift arm 5 and the bucket 6, a service brake device SB for braking the wheels 13, a parking brake device PB, and a parking hydraulic circuit B for releasing the braking of the parking brake device PB. In FIG. 2, the steering circuit for steering the wheel loader 1 is omitted.

The loading hydraulic circuit A includes a control valve 32 for the lift arm cylinders 8 and a control valve 33 for the bucket cylinder 7. The hydraulic oil discharged from the variable displacement type main pump 30 flows through a center bypass line 34 to the control valve 33 for the bucket cylinder 7 and the control valve 32 for the lift arm cylinders 8 sequentially and returns to a tank 35. The pilot pressure depending on the manipulated variable of the lift arm operating lever (not shown) provided in the cab 9 is transmitted through the pilot valve 36 to the pressure receiving parts 32a and 32b of the control valve 32 for the lift arm cylinders 8 and similarly, the pilot pressure depending on the manipulated variable of the bucket operating lever (not shown) provided in the cab 9 is transmitted through the pilot valve 36 to the pressure receiving parts 33a and 33b of the control valve 33 for the bucket cylinder 7.

The pilot pressure exerted on the pressure receiving parts 32a, 32b of the control valve 32 changes the spool position of the control valve 32 so that the hydraulic oil discharged from the main pump 30 is supplied to the lift arm cylinders 8. This causes the lift arm 5 to rotate vertically. Similarly, the pilot pressure exerted on the pressure receiving parts 33a, 33b of the control valve 33 causes the bucket 6 to rotate vertically. The pilot pressure is introduced from the variable displacement type accessory pump 31 as a pilot oil pressure source through the parking hydraulic circuit B into the pressure receiving parts 32a, 32b, 33a, 33b of the control valves 32, 33.

The service brake device SB is a positive hydraulic brake device which generates a braking force depending on the amount of depression when a brake pedal 17 is depressed during traveling. The service brake device SB includes a brake valve 18 as well as a brake cylinder 16 and a brake disk 15 which are provided for each wheel 13. The brake valve 18 controls the pressure oil supplied from the accessory pump 31 to the brake cylinder 16 and presses the brake pad against the brake disk 15 to generate a braking force.

The spool of the brake valve 18 moves between a neutral position b1, b2 and a working position a1, a2 depending on the amount of depression of the brake pedal 17. When the brake pedal 17 is not depressed (when the amount of depression is 0), the spool of the brake valve 18 is switched to the neutral position b1, b2. As the amount of depression of the brake pedal 17 increases, the spool of the brake valve 18 moves toward the working position a1, a2 and when the amount of depression is the largest, it is switched to the working position a1, a2. The working position a1, a2 is the position at which the pressure oil is supplied to the brake cylinder 16 to activate the brake. The neutral position b1, b2 is the position at which the brake cylinder 16 is communicated to the tank 35 to release the brake.

The switching amount of the brake valve 18 (amount of spool movement) increases depending on the amount of depression of the brake pedal 17 and accordingly the braking force also increases. As the pressure oil is supplied to the brake cylinder 16, the brake cylinder 16 makes a stroke and presses the brake pad against the brake disk 15 to give the wheels 13 the braking force which decelerates or stops the wheel loader 1.

An unloader valve 25 and a decompression unit 19 are provided between the accessory pump 31 and the brake valve 18. The decompression unit 19 includes a filter 20, a reducing valve 21, check valves 22a, 22b, a pressure sensor 23a for detecting the pressure of a first brake line BL1, and a pressure sensor 23b for detecting the pressure of a second brake line BL2. This decompression unit 19 adjusts the pressure of the pressure oil to be supplied to the brake valve 18. The detection signals from the pressure sensors 23a and 23b are sent to a controller 100 (see FIG. 4B) and the controller 100 performs various control operations (which will be explained in detail later).

The unloader valve 25 is a known hydraulic valve unit which includes a pressure control valve, a throttle, and others. The circuit pressure of the second brake line BL2 is led through a pilot pipe line PL1 to the unloader valve 25. The pressure oil discharged from the accessory pump 31 is supplied through the unloader valve 25 to the first brake line BL1 and the second brake line BL2 (cut in), but when the pressure of the second brake line BL2 reaches a predetermined pressure, the pressure control valve constituting the unloader valve 25 is activated so that the oil discharged from the accessory pump 31 is returned from the unloader valve 25 to the tank 35. In this state, the pressure oil discharged from the accessory pump 31 is not supplied to the first brake line BL1 and the second brake line BL2 (cut out). The pressure oil discharged from the accessory pump 31 is also supplied through the unloader valve 25 to a hydraulic motor 41 as a drive source for a fan 42.

The parking brake device PB is a negative brake device and has a hydraulic cylinder 50. The pressure oil discharged from the accessory pump 31 can be supplied to the oil chamber of the hydraulic cylinder 50 through the parking hydraulic circuit B which will be described next. When the brake release pressure is not exerted on the oil chamber, the hydraulic cylinder 50 gives the wheels 13 a braking force by pressing the parking brake disk (not shown) with the biasing force (elastic force) of a spring 51, and when the brake release pressure is exerted on the oil chamber, it releases the braking force.

Figure 3:
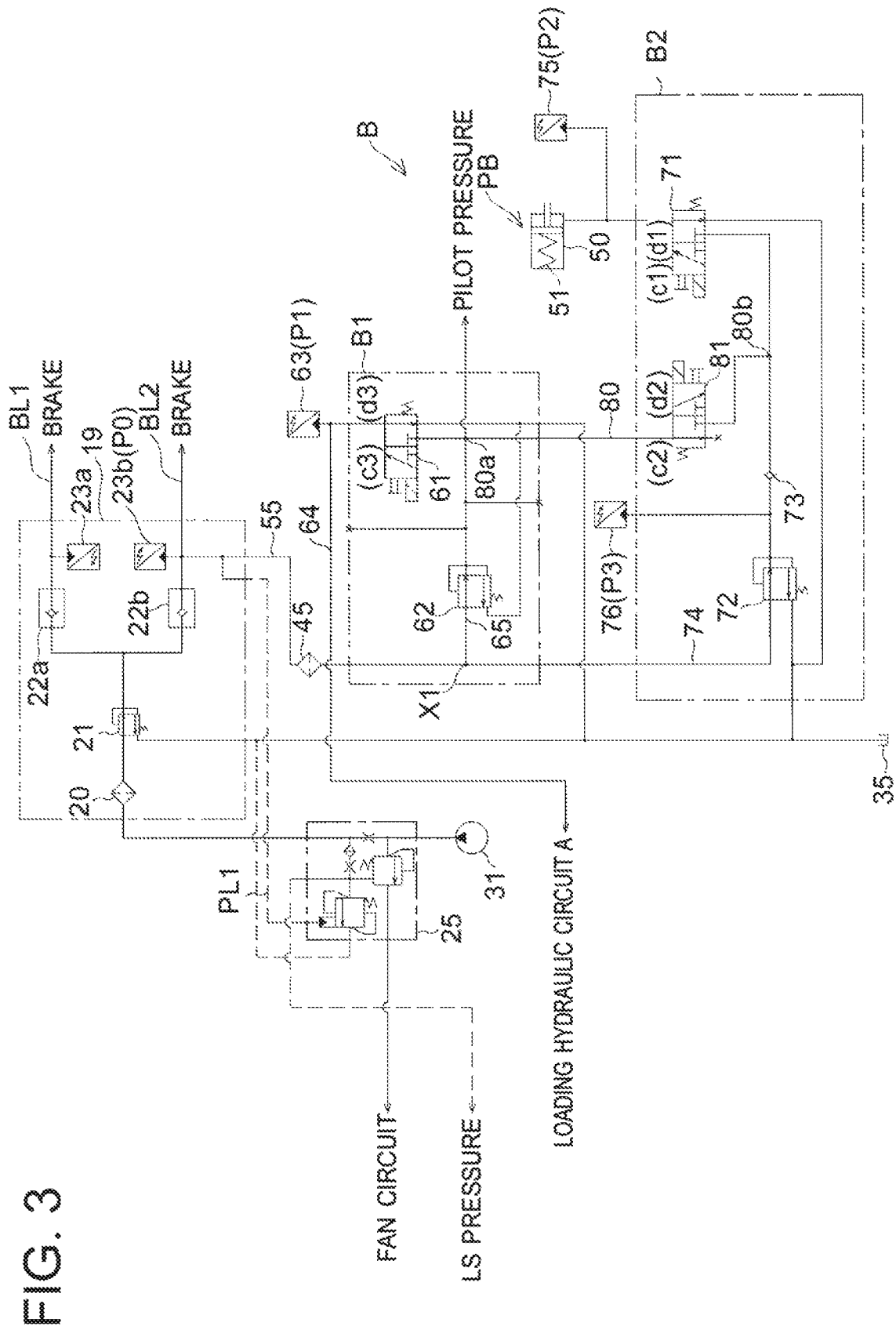
FIG. 3 is a configuration diagram of the parking hydraulic circuit B in the first embodiment.

Next, the parking hydraulic circuit B for releasing the braking of the parking brake device PB will be described in detail. FIG. 3 is a configuration diagram of the parking hydraulic circuit B in the first embodiment. The parking hydraulic circuit B includes a loading pilot circuit B1 (equivalent to the "loading operation hydraulic circuit" in the present invention) for supplying the pilot pressure to a loading hydraulic circuit A and a parking brake circuit B2 (equivalent to the "parking brake releasing hydraulic circuit" in the present invention) for supplying the pressure oil to the parking brake device PB.

The loading pilot circuit B1 and the parking brake circuit B2 are connected to each other through the second brake line BL2 and a flow path 55. In other words, the loading pilot circuit B1 and the parking brake circuit B2 mutually diverge from the flow path 55 at a diverging point X1 located downstream of a filter 45.

The loading pilot circuit B1 includes a directional solenoid valve 61 and a reducing valve 62. When the directional solenoid valve 61 is switched to a position c3 (seventh position), the pressure oil which has flowed from the flow path 55 to a flow path 65 at the diverging point X1 and has been decompressed by the reducing valve 62 flows from the flow path 65 to a flow path 64 through the directional solenoid valve 61 and is introduced into the loading hydraulic circuit A. On the other hand, when the directional solenoid valve 61 is switched to a position d3 (eighth position), the pressure oil in the flow path 64 returns to the tank 35. The reducing valve 62 decompresses the pressure oil to a predetermined pressure not less than the brake release pressure required to release the braking state of the parking brake device PB. In the explanation below, switching the directional solenoid valve 61 to the position c3 will be referred to as turning it ON and switching it to the position d3 will be referred to as turning it OFF.

The parking brake circuit B2 includes a directional solenoid valve 71 (equivalent to the "directional solenoid valve" in the present invention), a reducing valve 72 (equivalent to the "reducing valve" in the present invention), and a check valve 73 (equivalent to the "first check valve" in the present invention). The pressure oil having flowed in a flow path 74 is decompressed by the reducing valve 72 to the brake release pressure required to release the braking state of the parking brake device PB and flows through the check valve 73 toward the directional solenoid valve 71. The check valve 73 allows the pressure oil to flow only in one direction from the reducing valve 72 to the directional solenoid valve 71.

When the directional solenoid valve 71 is switched to a position c1 (first position), the pressure oil decompressed by the reducing valve 72 is supplied through the directional solenoid valve 71 to the oil chamber of the parking brake device PB. On the other hand, when the directional solenoid valve 71 is switched to a position d1 (second position), the pressure oil in the oil chamber of the parking brake device PB is returned to the tank 35 through the directional solenoid valve 71. In the explanation below, switching the directional solenoid valve 71 to the position c1 will be referred to as turning it ON and switching it to the position d1 will be referred to as turning it OFF.

The loading pilot circuit B1 and the parking brake circuit B2 are connected through an emergency flow path 80. One end 80a of the emergency flow path 80 is located between the reducing valve 62 and the directional solenoid valve 61 in the flow path 65 of the loading pilot circuit B1 and the other end 80b of the emergency flow path 80 is located between the check valve 73 and the directional solenoid valve 71 in the flow path 74 of the parking brake circuit B2. In other words, the other end 80b of the emergency flow path 80 is the "first confluence point" at which the flow path between the check valve 73 and the directional solenoid valve 71 joins the emergency flow path 80.

The emergency flow path 80 is provided with a directional solenoid valve 81 (equivalent to the "emergency directional solenoid valve" in the present invention) to open or close the emergency flow path 80 according to a command from the controller 100 which will be described later. When the directional solenoid valve 81 is switched to a position d2 (communicating position/open position), the pressure oil flowing in the loading pilot circuit B1 can be introduced into the parking brake circuit B2 through the emergency flow path 80. On the other hand, when the directional solenoid valve 81 is switched to a position c2 (shutoff position/close position), the emergency flow path 80 is shut off and the pressure oil flowing in the loading pilot circuit B1 cannot be introduced into the parking brake circuit B2 through the emergency flow path 80. In the explanation below, switching the directional solenoid valve 81 to the position d2 will be referred to as turning it ON and switching it to the position c2 will be referred to as turning it OFF.

Figure 4A:
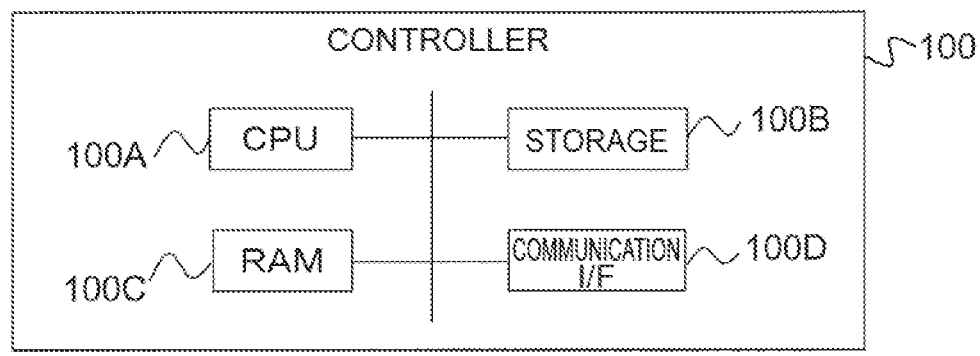
FIG. 4A is a hardware configuration diagram of the controller 100.

Next, the controller 100 which controls operation of the directional solenoid valves 61, 71, and 81 will be described. FIG. 4A is a hardware configuration diagram of the controller 100 and FIG. 4B is a block diagram which shows input and output of the controller 100.

As shown in FIG. 4A, the controller 100 is constituted by hardware including a CPU 100A for performing various arithmetic operations, a storage 100B for storing the program to implement the arithmetic operations by the CPU 100A such as a ROM or HDD, a RAM 100C as a working area for the CPU 100A to execute the program, and a communication interface (communication I/F) 100D as an interface for reception and transmission of data with another device, and software which is stored in the storage 100B and executed by the CPU 100A. The various functions of the controller 100 are implemented by the CPU 100A loading the various programs stored in the storage 100B, on the RAM 100C, and executing them.

Figure 4B:
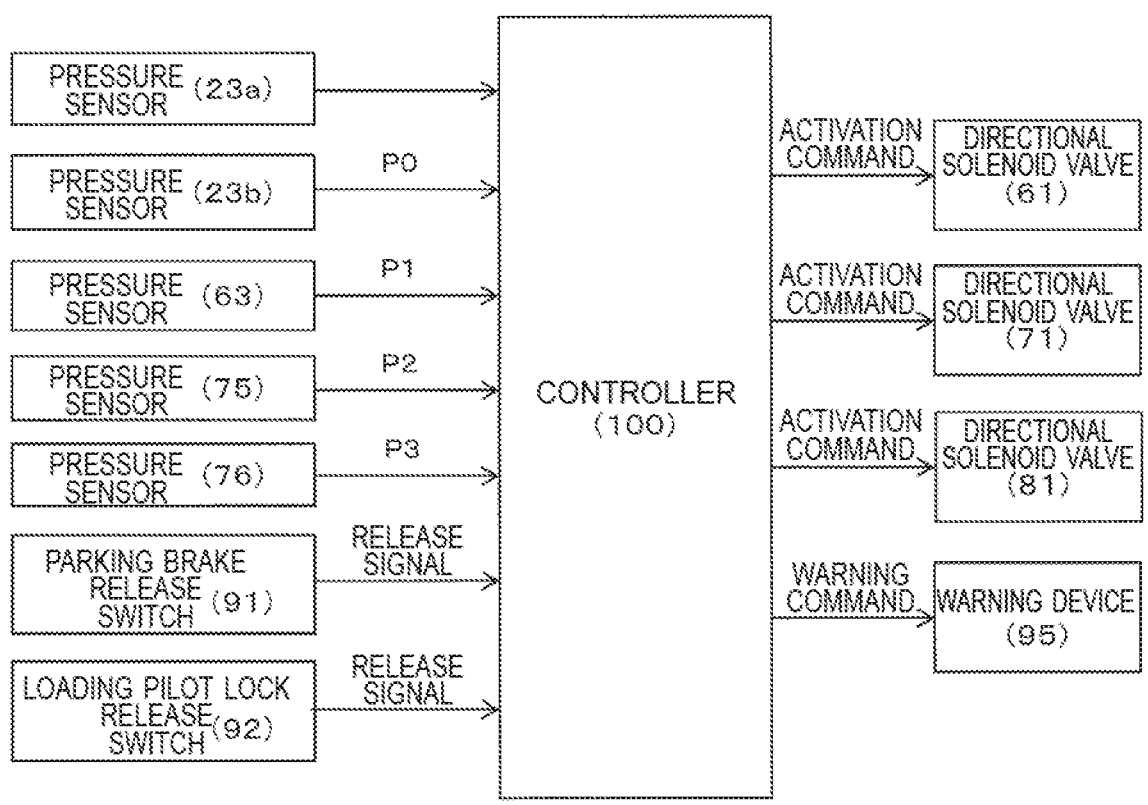
FIG. 4B is a block diagram which shows input and output of the controller 100.

As shown in FIG. 4B, in the controller 100, pressure sensors 23a, 23b, 63, 75, and 76, a parking brake release switch 91 and a loading pilot lock release switch 92 are connected on the input side and the directional solenoid valves 61, 71, and 81 and a warning device 95 are connected on the output side.

The controller 100 receives the pressure signals detected by the pressure sensors 23a, 23b, 63, 75, and 76, the operation signal from the parking brake release switch 91, and the operation signal from the loading pilot lock release switch 92, and after the controller 100 has performed processing as will be described later, it sends an activation command to the directional solenoid valves 61, 71, and 81 and sends a warning command to the warning device 95. The warning device 95 is, for example, a monitor, speaker or the like, which is provided in the cab 9.

The pressure P0 detected by the pressure sensor 23b is the pressure of the pressure oil flowing in the second brake line BL2, namely the supply source pressure of the pressure oil which is supplied to the parking brake device PB. The pressure P1 detected by the pressure sensor 63 is the pressure of the pressure oil which is supplied from the loading pilot circuit B1 to the loading hydraulic circuit A, namely the loading pilot pressure. The pressure P2 detected by the pressure sensor 75 is the pressure of the pressure oil at the inlet of the parking brake device PB, namely the parking brake chamber pressure. The pressure P3 detected by the pressure sensor 76 (equivalent to the "pressure sensor" in the present invention) is the pressure downstream of the reducing valve 72 in the parking brake circuit B2, namely the secondary pressure of the reducing valve 72.

The parking brake release switch 91 is a switch which is located in the cab 91 to release the parking brake device PB. When the operator releases the parking brake release switch 91 in the cab 9, the controller 100 receives a release signal. The loading pilot lock release switch 92 is a switch which is located in the cab 9 to release the locked state of the front working device 4 in loading operation. When the operator releases the loading pilot lock release switch 92 in the cab 9, the controller 100 receives a release signal.

Next, details of processing by the controller 100 will be explained. FIG. 5 is a diagram which shows the judgement conditions to send an ON/OFF command to the directional solenoid valve 81. In the explanation below, thresholds Pr0, Pr1, Pr2, and Pr3 are each set to the pressure at which the braking state of the parking brake device PB can be released (brake release pressure), but the pressure drop depending on the distance between the parking brake device PB and each of the pressure sensors 23b, 63, 75, and 76 may be added to the thresholds Pr0, Pr1, Pr2 or Pr3.

(Condition 1)

Figure 6:
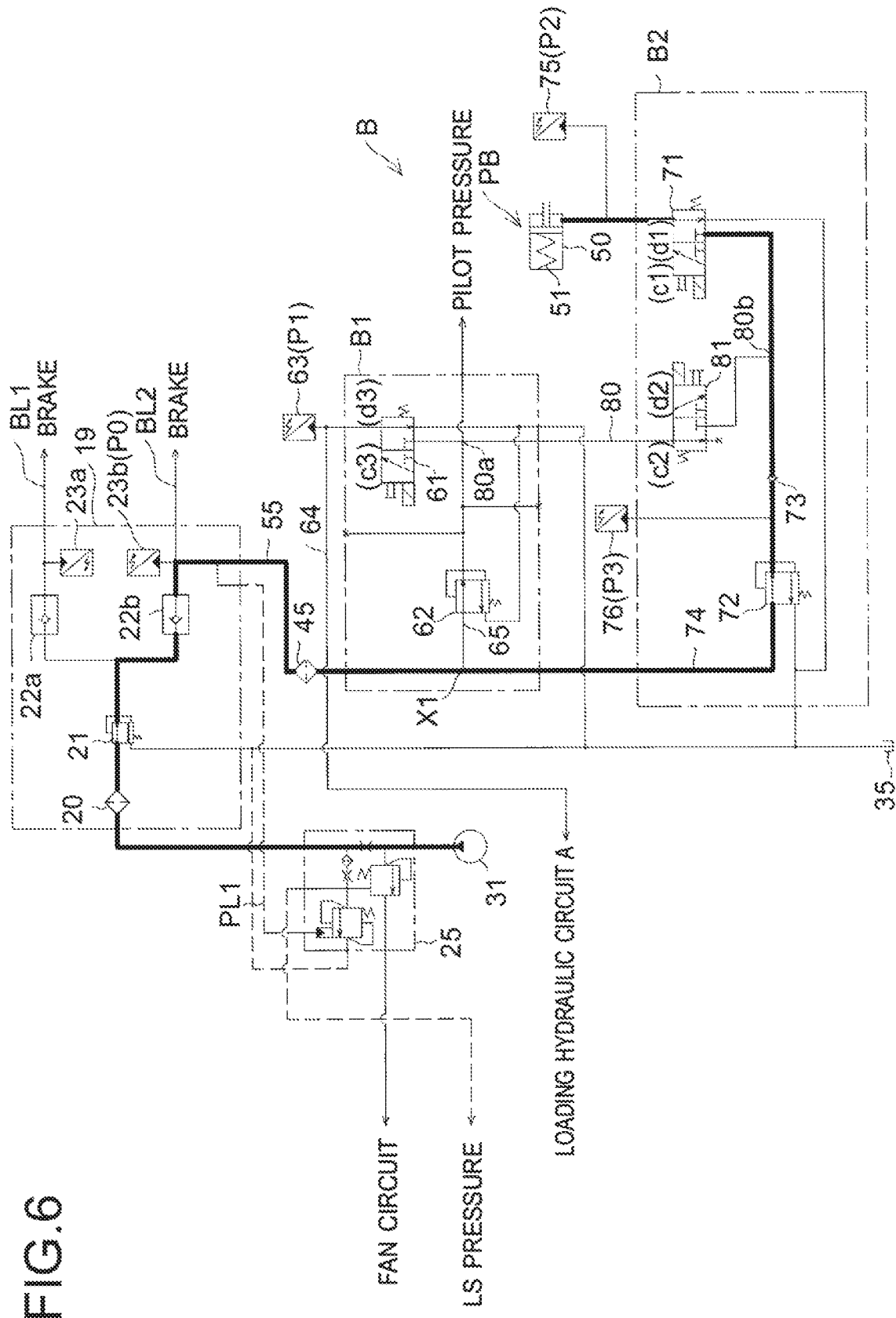
FIG. 6 is a diagram which indicates the flow of the pressure oil in condition 1.

When the directional solenoid valve 71 is ON, the pressure P3 detected by the pressure sensor 76 is normal pressure (P3 threshold Pr3), and the pressure P2 detected by the pressure sensor 75 is normal pressure (P2≥threshold Pr2), the state of the wheel loader 1 is normal and thus the controller 100 turns OFF the directional solenoid valve 81. FIG. 6 indicates the flow of the pressure oil in this case by bold line. As shown in FIG. 6, the pressure oil discharged from the accessory pump 31 flows from the second brake line BL2 in the flow path 55 and the flow path 74 and is supplied to the parking brake device PB through the reducing valve 72, check valve 73, and directional solenoid valve 71 to release the braking state of the parking brake device PB.

(Condition 2)

When the directional solenoid valve 71 is ON, the pressure P3 detected by the pressure sensor 76 is normal pressure (P3≥threshold Pr3), and the pressure P2 detected by the pressure sensor 75 is low pressure (P2<threshold Pr2), the directional solenoid valve 71 is malfunctioning and thus the controller 100 turns OFF the directional solenoid valve 81.

(Condition 3)

When the directional solenoid valve 71 is ON, the pressure P3 detected by the pressure sensor 76 is low pressure (P3<threshold Pr3), the pressure P2 detected by the pressure sensor 75 is low pressure (P2<threshold Pr2), the directional solenoid valve 61 is ON, the pressure P1 detected by the pressure sensor 63 is normal pressure (P1≥threshold Pr1), and the pressure P0 detected by the pressure sensor 23b is normal pressure (P0≥threshold Pr0), the pressure in the parking brake circuit B2 is improperly adjusted (abnormal) and thus the controller 100 turns ON the directional solenoid valve 81. For example, if due to malfunctioning of the reducing valve 72 or another reason the secondary pressure of the reducing valve 72 is smaller than the brake release pressure, this case corresponds to the condition 3.

Figure 7:
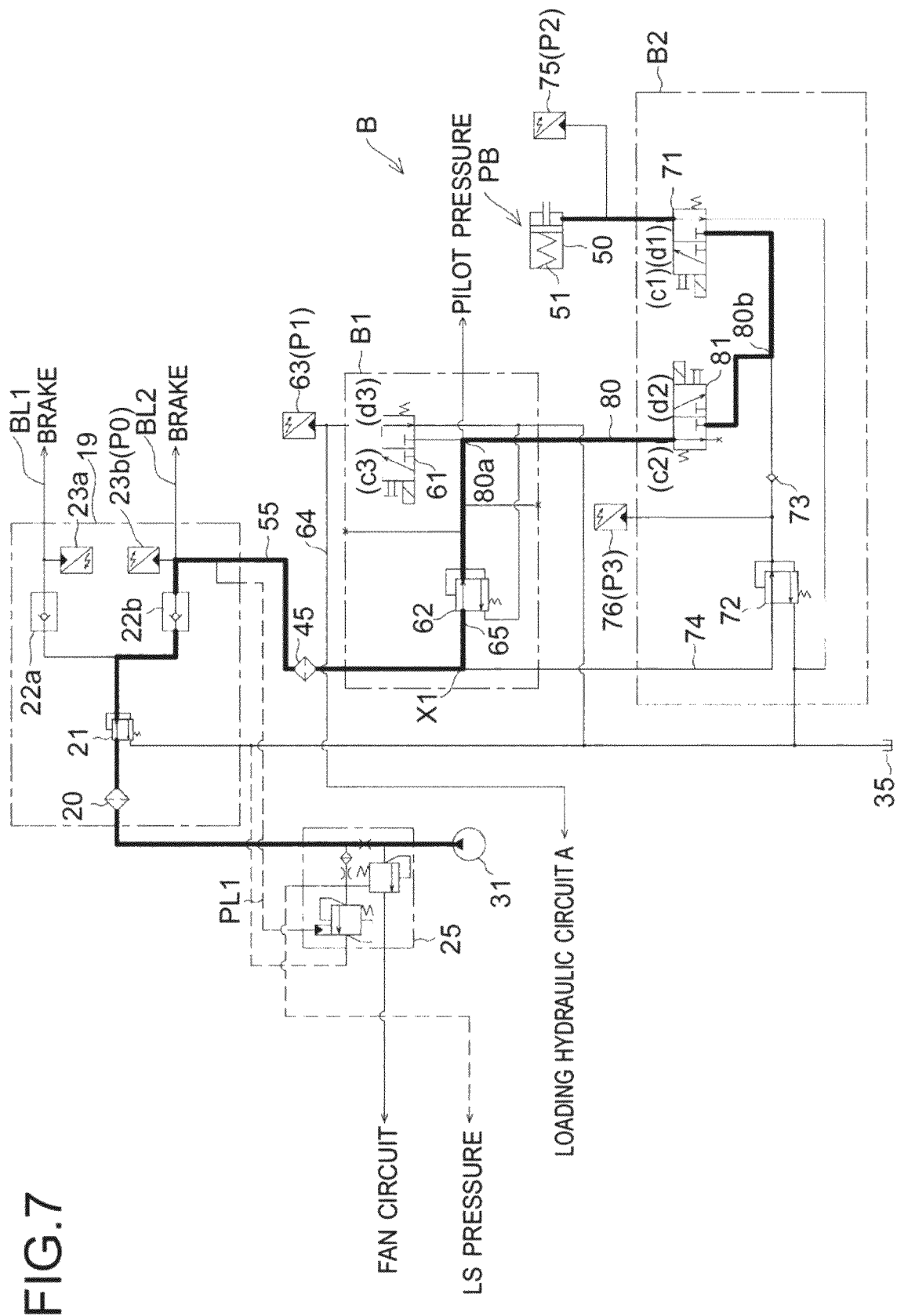
FIG. 7 is a diagram which indicates the flow of the pressure oil in condition 3.

FIG. 7 indicates the flow of the pressure oil in this case by bold line. As shown in FIG. 7, the pressure oil discharged from the accessory pump 31 is decompressed by the reducing valve 62 in the loading pilot circuit B1, flows in the emergency flow path 80, and is supplied to the parking brake device PB through the directional solenoid valve 81 and the directional solenoid valve 71. Therefore, even if the secondary pressure of the reducing valve 72 is smaller than the brake release pressure, the pressure oil with a pressure not less than the brake release pressure can be supplied from the emergency flow path 80 to the parking brake device PB and thus the braking state of the parking brake device PB can be released reliably.

(Condition 4)

When the directional solenoid valve 71 is ON, the pressure P3 detected by the pressure sensor 76 is low pressure (P3<threshold Pr3), the pressure P2 detected by the pressure sensor 75 is low pressure (P2<threshold Pr2), and the pressure P0 detected by the pressure sensor 23b is low pressure (P0<threshold Pr0), the pilot oil pressure source as the pressure oil supply source has some defect and thus the controller 100 turns OFF the directional solenoid valve 81.

(Condition 5)

When the directional solenoid valve 71 is ON, the pressure P3 detected by the pressure sensor 76 is low pressure (P3<threshold Pr3), the pressure P2 detected by the pressure sensor 75 is low pressure (P2<threshold Pr2), and the pressure P0 detected by the pressure sensor 23b is normal pressure (P0<threshold Pr0), the pressure in the parking brake circuit B2 is improperly adjusted and thus the controller 100 turns ON the directional solenoid valve 81. FIG. 7 indicates the flow of the pressure oil in this case. Since the pressure oil with normal pressure is supplied from the loading pilot circuit B1 to the parking brake circuit B2 by turning ON the directional solenoid valve 81, the braking state of the parking brake device PB can be released reliably.

(Condition 6)

When the pressure P3 detected by the pressure sensor 76 is normal pressure (P3≥threshold Pr3), the directional solenoid valve 61 is ON and the pressure P1 detected by the pressure sensor 63 is low pressure (P1<threshold Pr1), the pressure in the loading pilot circuit B1 is improperly adjusted and thus the controller 100 turns ON the directional solenoid valve 81. For example, if malfunctioning of the reducing valve 62 causes the secondary pressure of the reducing valve 62 to drop, this case corresponds to the condition 6.

Figure 8:
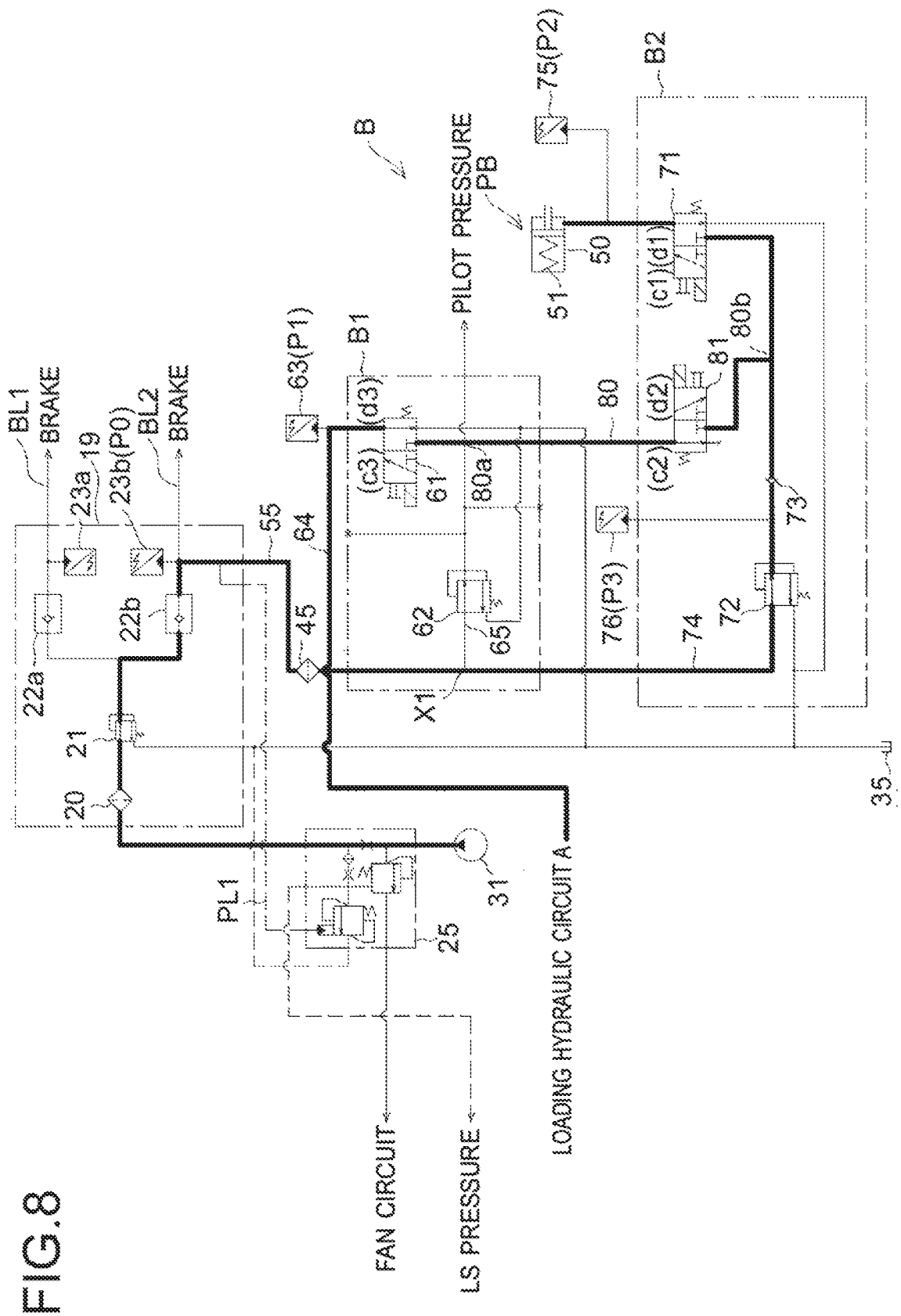
FIG. 8 is a diagram which indicates the flow of the pressure oil in condition 6.

The pressure oil with normal pressure is supplied from the parking brake circuit B2 to the loading pilot circuit B1 by turning ON the directional solenoid valve 81 and a predetermined pilot pressure is supplied to the control valves 32, 33 through the loading hydraulic circuit A. FIG. 8 indicates the flow of the pressure oil in this case by bold line. As shown in FIG. 8, the pressure oil discharged from the accessory pump 31 flows in the flow path 55 diverging from the second brake line BL2 and is decompressed by the reducing valve 72 in the parking brake circuit B2, and flows in the emergency flow path 80 through the directional solenoid valve 81 and is supplied to the loading pilot circuit B1. Then, the pressure oil flows in the flow path 64 from the directional solenoid valve 61 in the loading pilot circuit B1 and is introduced into the loading hydraulic circuit A as an "operation signal pressure". Consequently, even if the pressure in the loading pilot circuit B1 is improperly adjusted, loading operation can be carried out using the pressure oil from the parking brake circuit B2. By turning ON the directional solenoid valve 71, releasing of the parking brake device PB and loading operation can be carried out at the same time.

(Condition 7)

When the directional solenoid valve 71 is ON, the pressure P3 detected by the pressure sensor 76 is low pressure (P3<threshold Pr3), the pressure P2 detected by the pressure sensor 75 is low pressure (P2<threshold Pr2), the directional solenoid valve 61 is ON, the pressure P1 detected by the pressure sensor 63 is low pressure (P1<threshold Pr1), and the pressure P0 detected by the pressure sensor 23b is normal pressure (P0≥threshold Pr0), the pressure in the parking brake circuit B2 is improperly adjusted and the pressure in the loading pilot circuit B1 is also improperly adjusted and thus the controller 100 turns OFF the directional solenoid valve 81.

Figure 9:
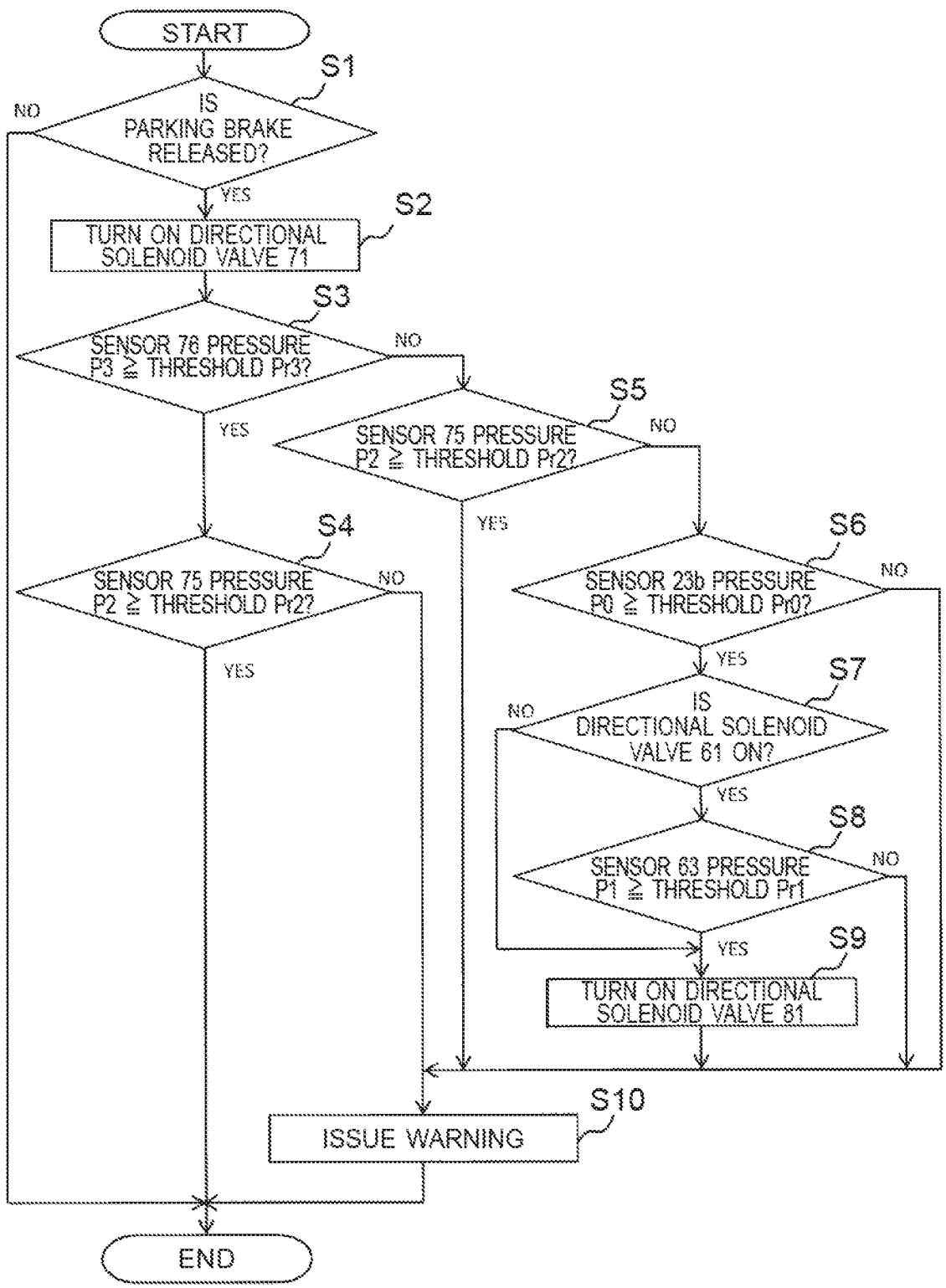
FIG. 9 is a flowchart which shows the control processing sequence of the controller 100.
Figure 10:
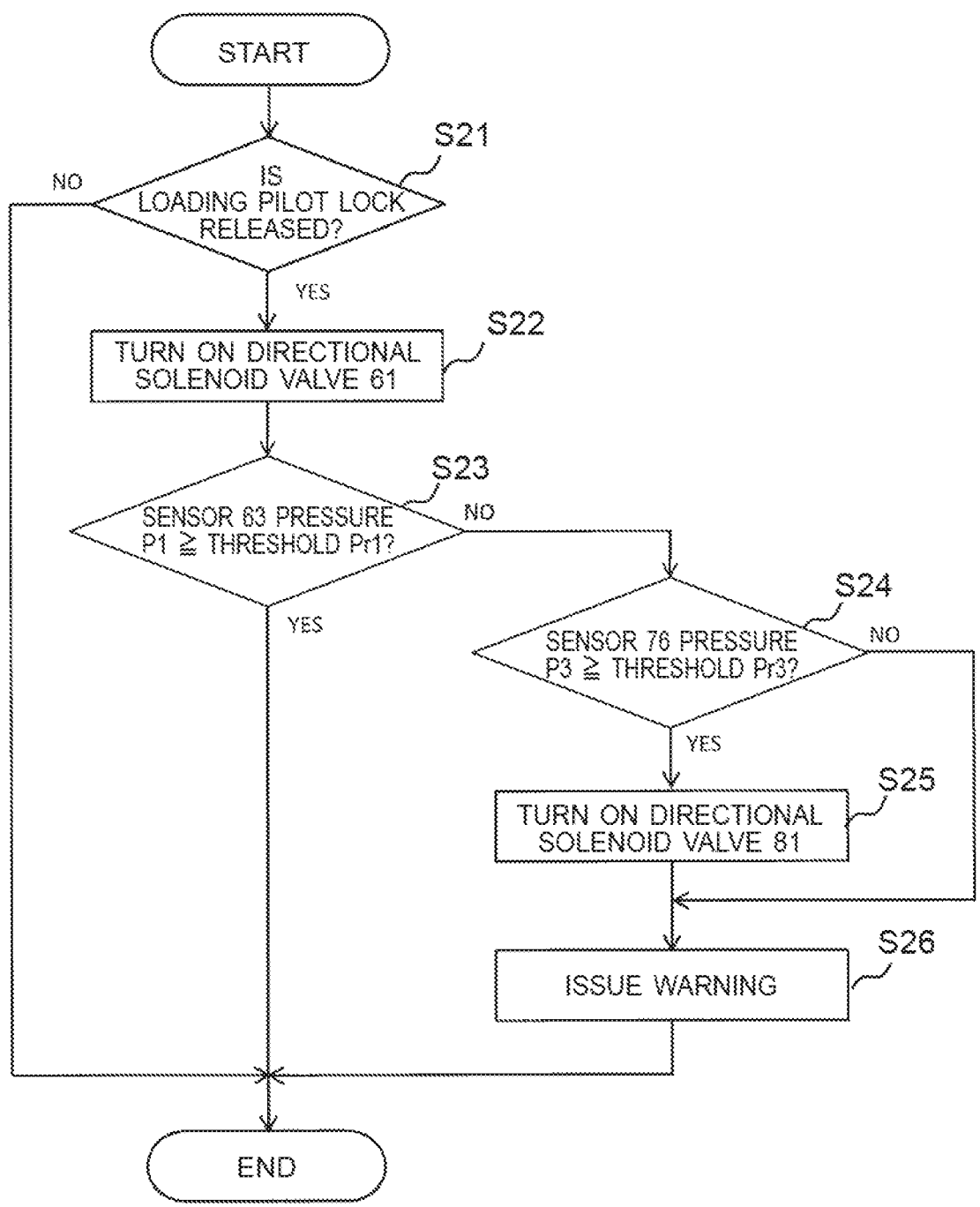
FIG. 10 is a flowchart which shows the control processing sequence of the controller 100.

Next, the control processing sequence of the controller 100 will be explained. FIG. 9 and FIG. 10 are flowcharts which show the control processing sequence of the controller 100 and FIG. 9 is a flowchart which shows the control process after releasing the parking brake and corresponds to the conditions 1 to 5 and 7. FIG. 10 is a flowchart which shows the control process after releasing the loading pilot lock and corresponds to the condition 6. The control processes shown in FIGS. 9 and 10 are started, for example, at the time when the controller 100 receives an ON signal from the engine key switch (not shown) and are performed in a predetermined cycle until it receives an OFF signal from the engine key switch.

As shown in FIG. 9, the controller 100 decides whether or not a release signal is received from the parking brake release switch 91 and if the release signal is received (S1/Yes), it turns ON the directional solenoid valve 71 (S2). Then, the controller 100 decides whether or not the pressure P3 detected by the pressure sensor 76 is the threshold Pr3 or more and if the pressure P3 is the threshold Pr3 or more (S3/Yes), it decides whether or not the pressure P2 detected by the pressure sensor 75 is the threshold Pr2 or more, and if the pressure P2 is the threshold Pr2 or more (S4/Yes), the state of the wheel loader 1 is normal and the process is ended.

On the other hand, if the pressure P2 detected by the pressure sensor 75 is less than the threshold Pr2 (S4/No), the controller 100 sends a warning command to the warning device 95 and the warning device 95 issues a warning (S10). Also, if the pressure P3 detected by the pressure sensor 76 is less than the threshold Pr3 (S3/No), the controller 100 decides whether or not the pressure P2 detected by the pressure sensor 75 is the threshold Pr2 or more and if the pressure P2 is the threshold Pr2 or more (S5/Yes), it sends a warning command to the warning device 95 and the warning device 95 issues a warning (S10). On the other hand, if the pressure P2 is less than the threshold Pr2 (S5/No), the controller 100 decides whether or not the pressure P0 detected by the pressure sensor 23b is the threshold Pr0 or more and if the pressure P0 is the threshold Pr0 or more (S6/Yes), it decides whether or not the directional solenoid valve 61 is ON (S7). Since the controller 100 controls opening/closing of the directional solenoid valve 61 as shown in FIG. 4B, it can decide whether the directional solenoid valve 61 is now ON or OFF.

If the directional solenoid valve 61 is ON (S7/Yes), the controller 100 decides whether or not the pressure P1 detected by the pressure sensor 63 is the threshold Pr1 or more, and if the pressure P1 is the threshold Pr1 or more (S8/Yes), it turns ON the directional solenoid valve 81 (S9). Consequently, the pressure oil is supplied from the loading pilot circuit B1 to the parking brake circuit B2 through the emergency flow path 80. Also, if the directional solenoid valve 61 is OFF at S7 (S7/No), the controller 100 does not carry out S8 to compare the pressure P1 detected by the pressure sensor 63 against the threshold Pr1 and turns ON the directional solenoid valve 81 (S9). Then, the controller 100 issues a warning (S10) and ends the process. If the decision at S6 is No and the decision at S8 is No, the controller 100 does not turn ON the directional solenoid valve 81 and issues a warning (S10) and ends the process. If it is decided at S1 that the parking brake device PB is not released (S1/No), the controller 100 ends the process.

As shown in FIG. 10, the controller 100 decides whether or not a release signal is received from the loading pilot lock release switch 92 and if the release signal is received (S21/Yes), it turns ON the directional solenoid valve 61 (S22). Then, the controller 100 decides whether or not the pressure P1 detected by the pressure sensor 63 is the threshold Pr1 or more and if the pressure P1 is the threshold Pr1 or more (S23/Yes), the state of the wheel loader 1 is normal and the process is ended.

On the other hand, if the pressure P1 is less than the threshold Pr1 (S23/No), the controller 100 decides whether or not the pressure P3 detected by the pressure sensor 76 is the threshold Pr3 or more, and if the pressure P3 is the threshold Pr3 or more (S24/Yes), the controller 100 turns ON the directional solenoid valve 81 (S25). When the directional solenoid valve 81 is turned ON, the loading pilot circuit B1 and parking brake circuit B2 are communicated through the emergency flow path 80 and thus the pressure oil can be supplied from the parking brake circuit B2 to the loading pilot circuit B1.

Then, the controller 100 sends a warning command to the warning device 95 and the warning device 95 issues a warning (S26) and the process is ended. On the other hand, if the pressure P3 is less than the threshold Pr3 (S24/No), the controller 100 does not turn ON the directional solenoid valve 81, issues a warning (S26) and ends the process. If the decision at S21 is No, the controller 100 ends the process.

Here, the relation between each condition and the steps in the flowcharts is summarized as follows.

| | |
|---|---|
| S1/Yes→S2→S3/Yes→S4/Yes | (condition 1): |
| S1/Yes→S2→S3/Yes→S4/No→S10 | (condition 2): |
| S1/Yes→S2→S3/No→S5/No→S6/Yes→S7/Yes→S8/Yes→S9→S10 | (condition 3): |
| S1/Yes→S2→S3/No→S5/No→S6/No→S10 | (condition 4): |
| S1/Yes→S2→S3/No→S5/No→S6/Yes→S7/No→S9→S10 | (condition 5): |
| S21/Yes→S22→S23/No→S24/Yes→S25→S26 | (condition 6): |
| S1/Yes→S2→S3/No→S5/No→S6/Yes→S7/Yes→S8/No→S10 | (condition 7): |

The warnings which are issued at S10 or S26 may be the same regardless of the condition, or different types of warnings may be issued depending on the condition 2 to condition 7.

As explained so far, according to the first embodiment, the loading pilot circuit B1 and the parking brake circuit B2 are connected in parallel to the accessory pump 31 as an oil pressure source, so loading operation and parking brake releasing operation can be carried out at the same time. Specifically, while ensuring loading operation, parking brake releasing operation can be carried out. In addition, even if improper pressure adjustment of the parking brake circuit B2 occurs, the directional solenoid valve 81 is turned ON so that the pressure oil can be supplied from the loading pilot circuit B1 to the parking brake circuit B2 through the emergency flow path 80. Therefore, the braking state of the parking brake device PB can be released reliably and the vehicle can travel. In addition, since the warning device 95 issues a warning, the operator can become aware of an abnormality.

Second Embodiment

Figure 11:
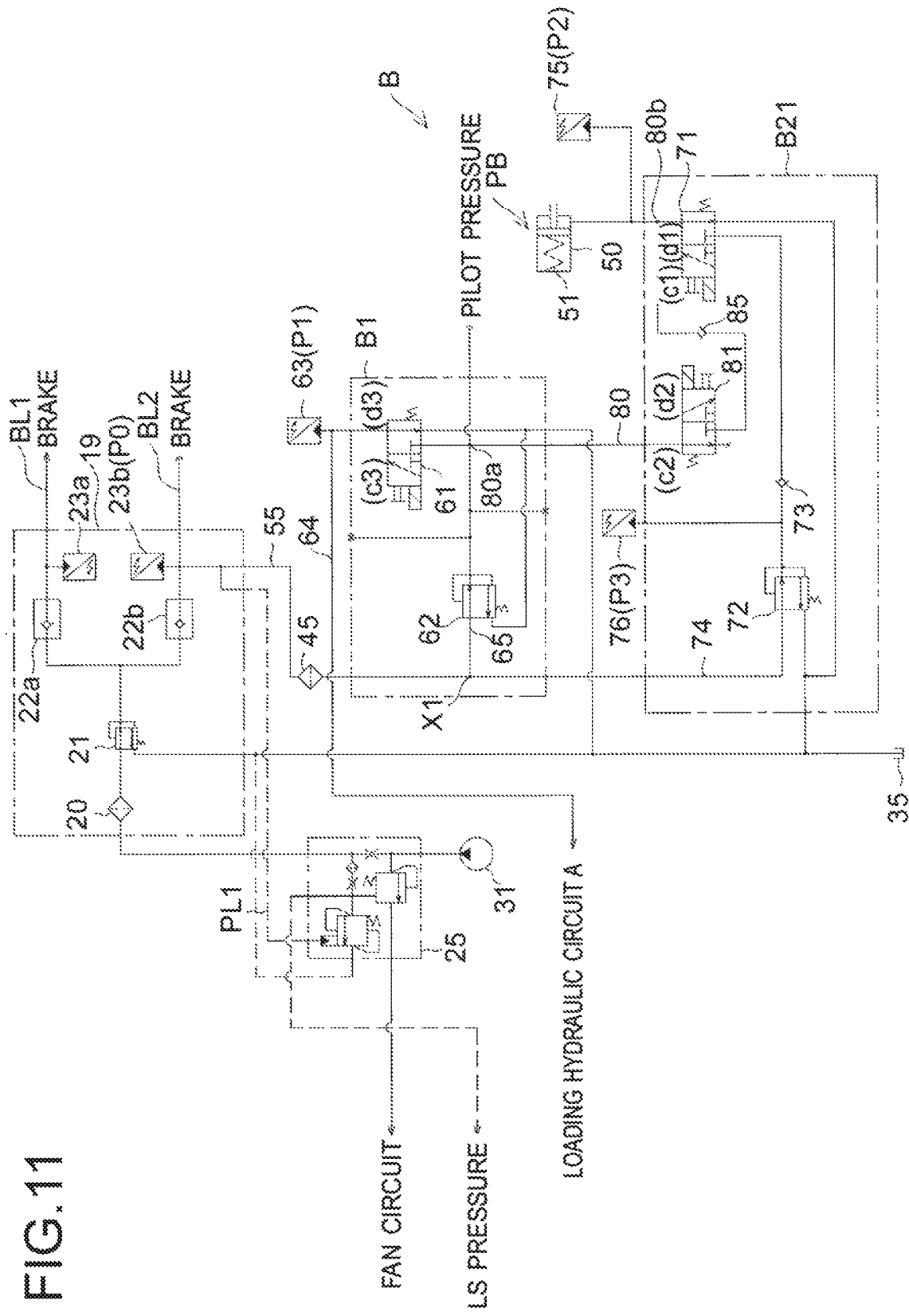
FIG. 11 is a configuration diagram of the parking hydraulic circuit B in the second embodiment.

Next, the second embodiment of the present invention will be described. FIG. 11 is a configuration diagram of the parking hydraulic circuit B in the second embodiment. The second embodiment is different from the first embodiment in the structure of the parking brake circuit B21 of the parking hydraulic circuit B. Specifically, it is different from the first embodiment in that the other end 80b of the emergency flow path 80 is located between the parking brake device PB and the directional solenoid valve 71 and a check valve 85 (equivalent to the "second check valve" in the present invention) is located between the directional solenoid valve 81 and the directional solenoid valve 71 in the emergency flow path 80. The check valve 85 allows the pressure oil to flow from the directional solenoid valve 81 to the other end 80b of the emergency flow path 80 and prevents the pressure oil from flowing in the direction opposite to that direction. The other end 80b of the emergency flow path 80 is the "second confluence point" at which the flow path between the parking brake device PB and the directional solenoid valve 71 joins the emergency flow path 80.

According to the second embodiment, the other end 80b of the emergency flow path 80 is located between the parking brake device PB and the directional solenoid valve 71, so even if the directional solenoid valve 71 should malfunction, the pressure oil can be reliably supplied from the loading pilot circuit B1 to the parking brake device PB through the emergency flow path 80. Therefore, the braking state of the parking brake device PB can be released more reliably than in the first embodiment.

Third Embodiment

Figure 12:
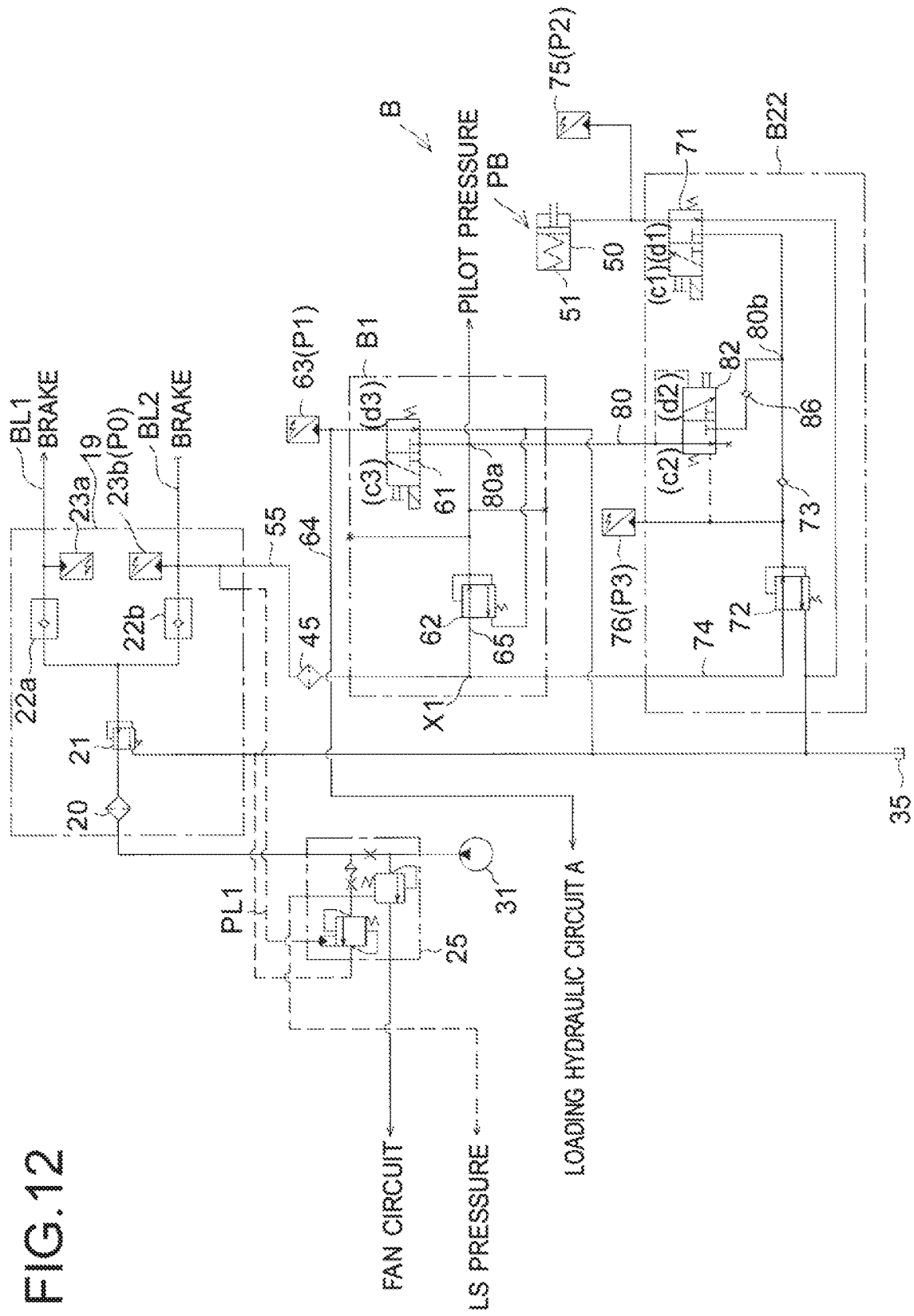
FIG. 12 is a configuration diagram of the parking hydraulic circuit B in the third embodiment.

Next, the third embodiment of the present invention will be described. FIG. 12 is a configuration diagram of the parking hydraulic circuit B in the third embodiment. The third embodiment is different from the first embodiment in the structure of the parking brake circuit B22 of the parking hydraulic circuit B. Specifically, it is different from the first embodiment in that in the emergency flow path 80, a switching valve 82 is provided in place of the directional solenoid valve 81 and a check valve 86 is provided between the switching valve 82 and the other end 80b of the emergency flow path 80. The check valve 86 allows the pressure oil to flow from the switching valve 82 to the other end 80b of the emergency flow path 80 and prevents the pressure oil from flowing in the direction opposite to that direction.

The switching valve 82 in the third embodiment is an autonomous switching valve in which the pressure on the loading pilot circuit B1 side is applied to one port and the pressure on the parking brake circuit B22 side is applied to the other port and the difference between the pressures applied to the both ports causes switching between the position c2 (shutoff position/close position) and the position d2 (communicating position/open position). Specifically, if the pressure on the loading pilot circuit B1 side is larger than the pressure on the parking brake circuit B22 side, the switching valve 82 is switched to the position d2 by itself to supply the pressure oil from the loading pilot circuit B1 to the parking brake circuit B22 through the emergency flow path 80. On the other hand, if the pressure on the loading pilot circuit B1 side is not larger than the pressure on the parking brake circuit B22 side, the switching valve 82 is switched to the position c2 by itself to close the emergency flow path 80. In the third embodiment, since the autonomous switching valve 82 is used, the set pressure for the reducing valve 62 is equal to the set pressure for the reducing valve 72.

In the third embodiment, since the autonomous switching valve 82 is used, the controller 100 need not control the switching valve 82. In other words, the structure to send an activation command to the directional solenoid valve 81 in FIG. 4B can be omitted. Therefore, the third embodiment not only brings about the same advantageous effects as the first embodiment but also offers an advantage that the control burden on the controller 100 can be reduced.

Fourth Embodiment

Figure 13:
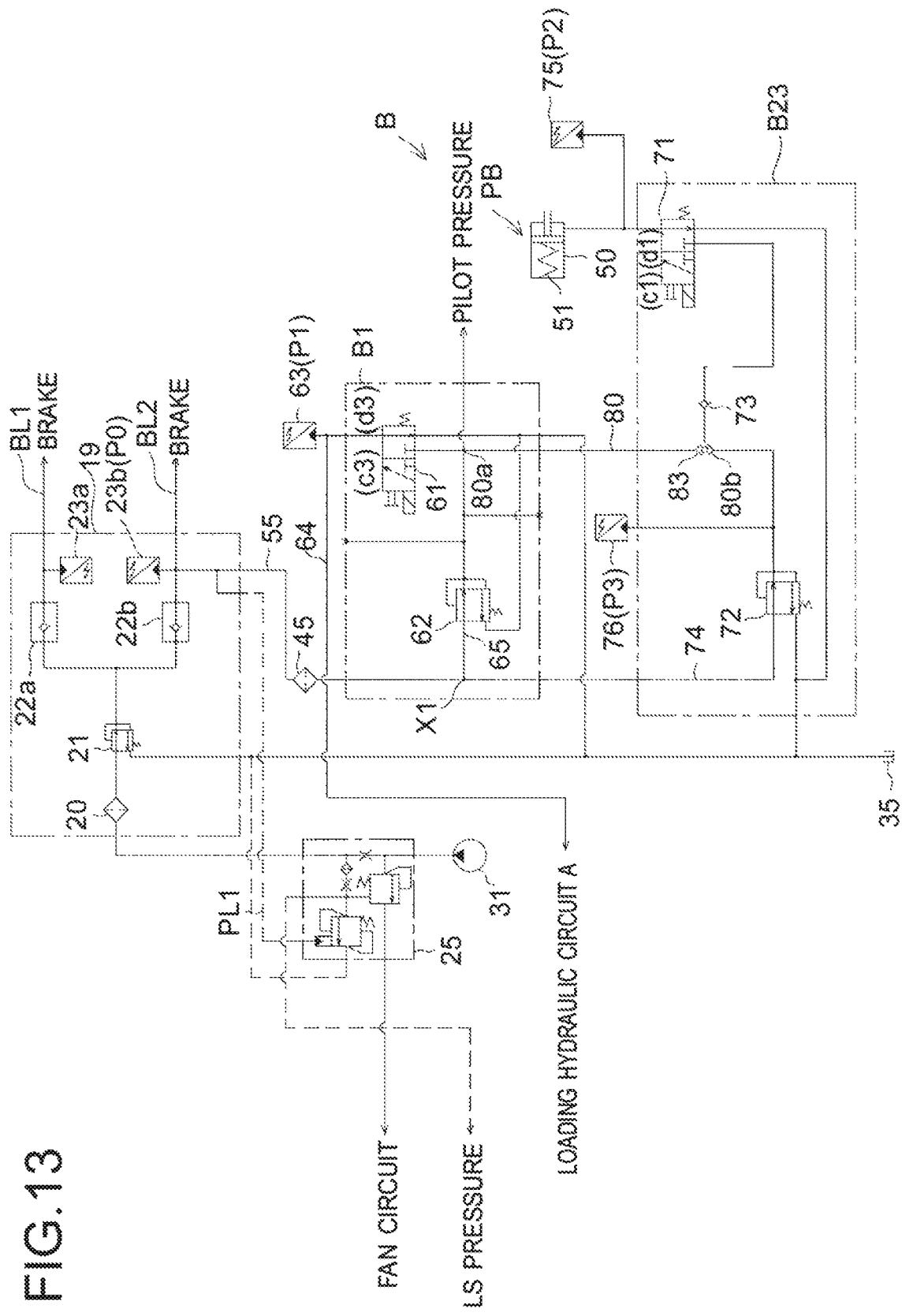
FIG. 13 is a configuration diagram of the parking hydraulic circuit B in the fourth embodiment.

Next, the fourth embodiment of the present invention will be described. FIG. 13 is a configuration diagram of the parking hydraulic circuit B in the fourth embodiment. The fourth embodiment is different from the third embodiment in the structure of the parking brake circuit B23 of the parking hydraulic circuit B. Specifically, it is different from the third embodiment in that a shuttle valve 83 for selecting the higher pressure side is provided in place of the autonomous switching valve 82. In the fourth embodiment, the check valve 73 is omissible.

The shuttle valve 83 used in the fourth embodiment is located at the position of the other end 80b of the emergency flow path 80 and selects the higher pressure between the loading pilot circuit B1 side pressure and the parking brake circuit B23 side pressure and transmits it to the downstream side. Therefore, if the loading pilot circuit B1 side pressure is higher than the parking brake circuit B23 side pressure, the pressure oil can be supplied from the loading pilot circuit B1 to the parking brake circuit B23 through the shuttle valve 83. Therefore, the fourth embodiment can also bring about the same advantageous effects as the third embodiment. In addition, the use of the shuttle valve 83 offers an advantage that the parking brake circuit B23 can be structurally simplified.

Fifth Embodiment

Figure 14:
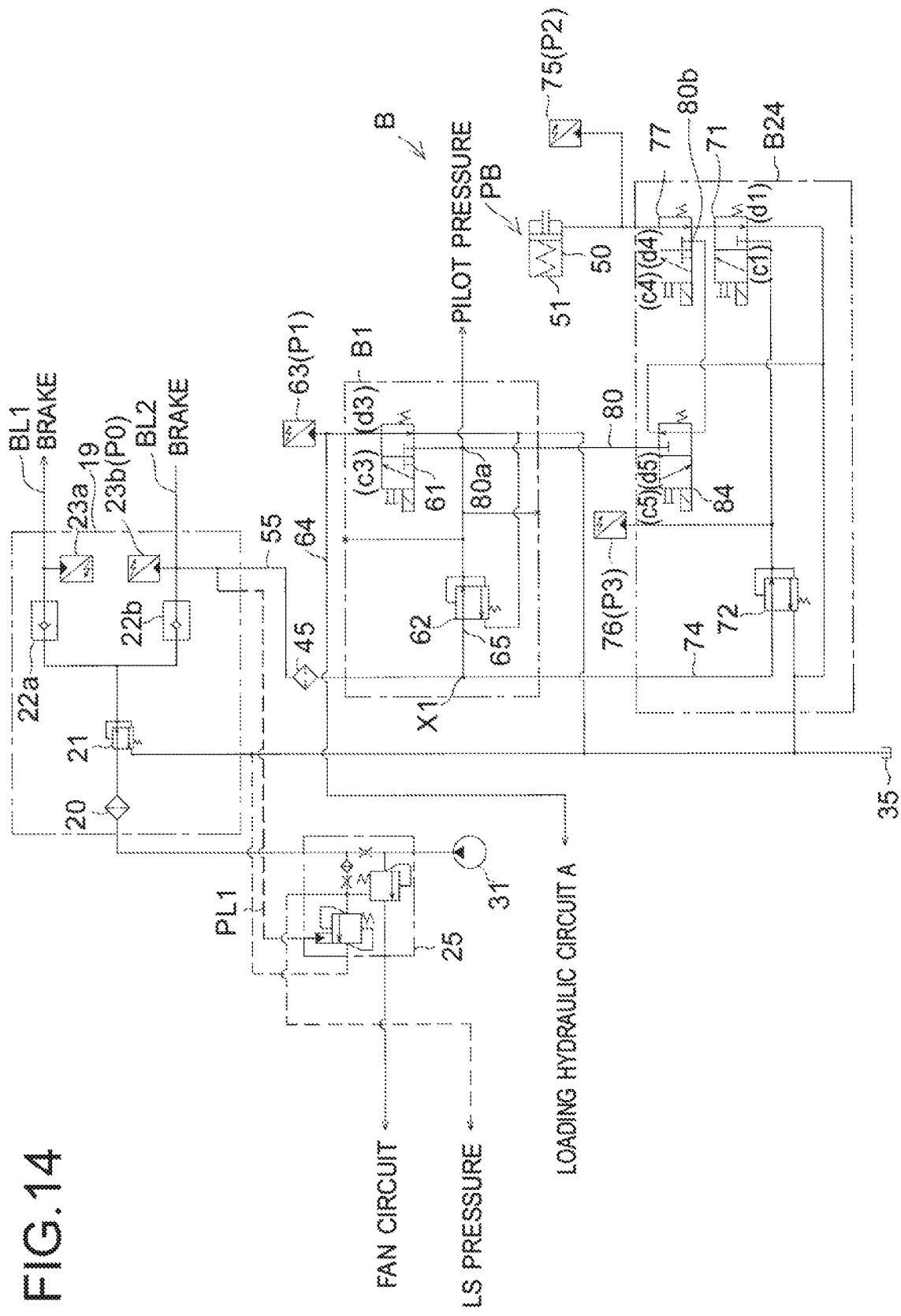
FIG. 14 is a configuration diagram of the parking hydraulic circuit B in the fifth embodiment.

Next, the fifth embodiment of the present invention will be described. FIG. 14 is a configuration diagram of the parking hydraulic circuit B in the fifth embodiment. The fifth embodiment is different from the first embodiment in the structure of the parking brake circuit B24 of the parking hydraulic circuit B. Specifically, it is different from the first embodiment in that a directional solenoid valve 77 is provided between the directional solenoid valve 71 and the parking brake device PB, the directional solenoid valve 77 is connected to the other end 80b of the emergency flow path 80, and the directional solenoid valve 77 and the directional solenoid valve 84 (equivalent to the "emergency directional solenoid valve" in the present invention) are controlled by the controller 100 so that the pressure oil in the parking brake device PB can be returned to the tank 35 through the directional solenoid valve 84.

The directional solenoid valve 77 can be switched between a position c4 (fifth position) for supplying the pressure oil to the parking brake device PB and a position d4 (sixth position) for returning the pressure oil supplied to the parking brake device PB to the tank 35. Also, the directional solenoid valve 84 can be switched between a position c5 (third position) for supplying the pressure oil to the parking brake device PB and a position d5 (fourth position) for returning the pressure oil supplied to the parking brake device PB to the tank 35. In the explanation below, switching the directional solenoid valve 77 to the position c4 will be referred to as turning it ON and switching the directional solenoid valve 84 to the position c5 will be referred to as turning it ON, and switching the directional solenoid valve 77 to the position d4 will be referred to as turning it ON and switching the directional solenoid valve 84 to the position d5 will be referred to as turning it OFF.

Next, details of processing by the controller 100 in the fifth embodiment will be explained. FIG. 15 is a diagram which shows the judgement conditions to send an ON/OFF command to the directional solenoid valve 84 and the directional solenoid valve 77.

(Condition 11)

When the directional solenoid valve 71 is ON, the pressure P3 detected by the pressure sensor 76 is normal pressure (P3≥threshold Pr3) and the pressure P2 detected by the pressure sensor 75 is normal pressure (P2≥threshold Pr2), the state of the wheel loader 1 is normal and thus the controller 100 turns OFF the directional solenoid valve 84 and the directional solenoid valve 77. The pressure oil discharged from the accessory pump 31 flows from the second brake line BL2 in the flow path 55 and the flow path 74 and is supplied to the parking brake device PB through the reducing valve 72, directional solenoid valve 71, and directional solenoid valve 77 to release the braking state of the parking brake device PB.

(Condition 12)

When the directional solenoid valve 71 is ON, the pressure P3 detected by the pressure sensor 76 is normal pressure (P3≥threshold Pr3), and the pressure P2 detected by the pressure sensor 75 is low pressure (P2<threshold Pr2), the directional solenoid valve 71 is malfunctioning and thus the controller 100 turns ON the directional solenoid valve 84 and the directional solenoid valve 77. Consequently, the pressure oil can be supplied from the loading pilot circuit B1 to the parking brake device PB through the emergency flow path 80 and the braking state of the parking brake device PB can be released reliably.

(Condition 13)

When the directional solenoid valve 71 is ON, the pressure P3 detected by the pressure sensor 76 is low pressure (P3<threshold Pr3), the pressure P2 detected by the pressure sensor 75 is low pressure (P2<threshold Pr2), the directional solenoid valve 61 is ON, the pressure P1 detected by the pressure sensor 63 is normal pressure (P1≥threshold Pr1), and the pressure P0 detected by the pressure sensor 23b is normal pressure (P0≥threshold Pr0), the pressure in the parking brake circuit B24 is improperly adjusted (abnormal) and thus the controller 100 turns ON the directional solenoid valve 84 and the directional solenoid valve 77. Consequently, the pressure oil can be supplied to the parking brake device PB reliably as in the condition 12.

(Condition 14)

When the directional solenoid valve 71 is ON, the pressure P3 detected by the pressure sensor 76 is low pressure (P3<threshold Pr3), the pressure P2 detected by the pressure sensor 75 is low pressure (P2<threshold Pr2) and the pressure P0 detected by the pressure sensor 23b is low pressure (P0<threshold Pr0), the pilot oil pressure source as the pressure oil supply source has some defect and thus the controller 100 turns OFF the directional solenoid valve 84 and the directional solenoid valve 77.

(Condition 15)

When the directional solenoid valve 71 is ON, the pressure P3 detected by the pressure sensor 76 is low pressure (P3<threshold Pr3), the pressure P2 detected by the pressure sensor 75 is low pressure (P2<threshold Pr2), and the pressure P0 detected by the pressure sensor 23b is normal pressure (P0≥threshold Pr0), the pressure in the parking brake circuit B24 is improperly adjusted and thus the controller 100 turns ON the directional solenoid valve 84 and the directional solenoid valve 77. Consequently, the pressure oil can be supplied to the parking brake device PB reliably as in the condition 12.

(Condition 16)

When the directional solenoid valve 71 is ON, the pressure P3 detected by the pressure sensor 76 is low pressure (P3<threshold Pr3), the pressure P2 detected by the pressure sensor 75 is low pressure (P2<threshold Pr2), the directional solenoid valve 61 is ON, the pressure P1 detected by the pressure sensor 63 is low pressure (P1<threshold Pr1), and the pressure P0 detected by the pressure sensor 23b is normal pressure (P0≥threshold Pr0), the pressure in the parking brake circuit B24 is improperly adjusted and the pressure in the loading pilot circuit B1 is also improperly adjusted and thus the controller 100 turns OFF the directional solenoid valve 84 and the directional solenoid valve 77.

Figure 16:
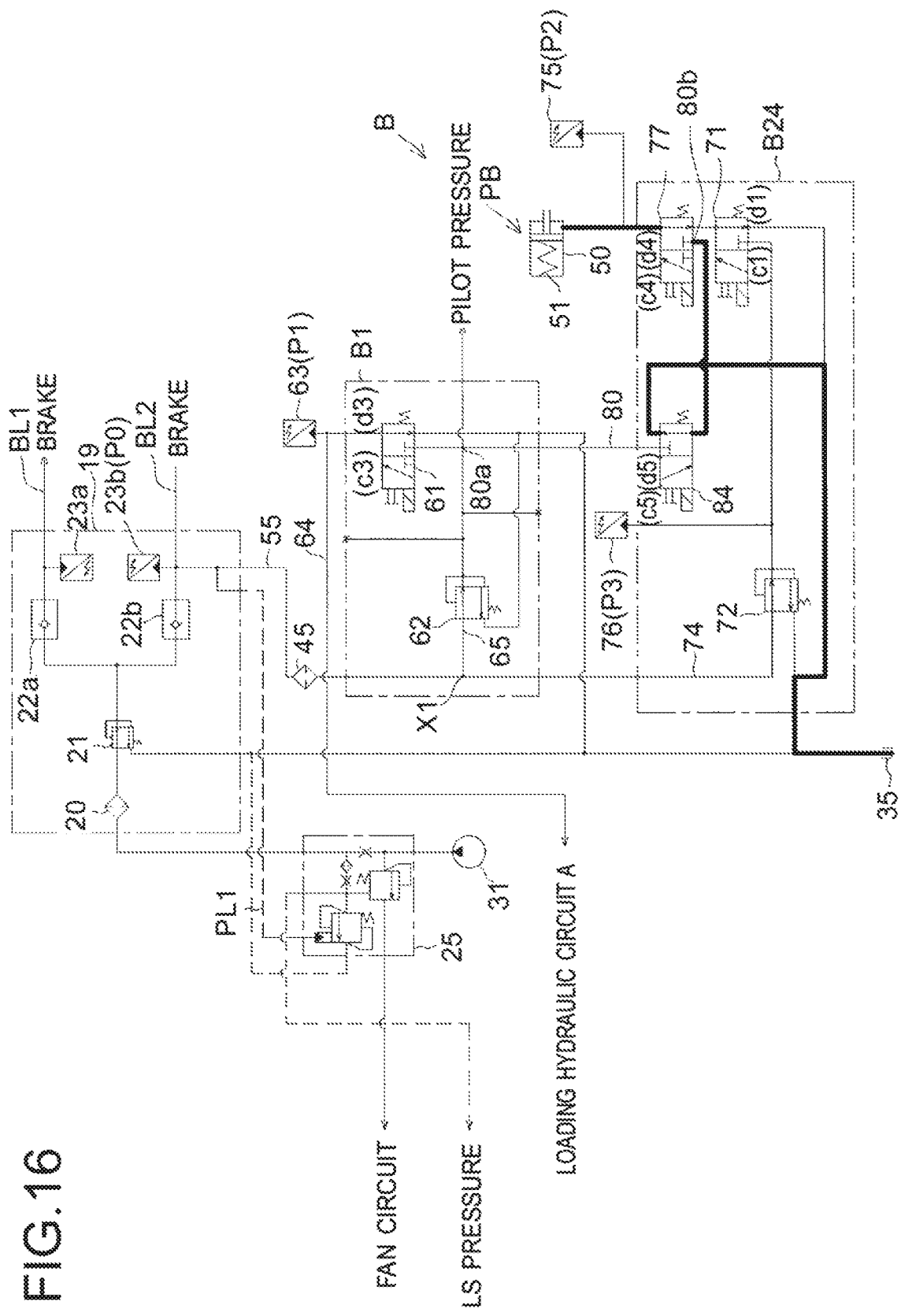
FIG. 16 is a diagram which shows the flow of the pressure oil when the pressure oil is returned to the tank through the directional solenoid valve 84.

Here, for example, referring to FIG. 16, an explanation is given below of the case that when the directional solenoid valve 71 malfunctions and remains ON without being turned OFF, the pressure oil is returned from the parking brake device PB to the tank 35. FIG. 16 is a diagram which shows the flow of the pressure oil in the case that the pressure oil is returned to the tank through the directional solenoid valve 84. When, according to an activation command from the controller 100, the directional solenoid valve 77 is turned ON and the directional solenoid valve 84 is turned OFF, as shown in FIG. 16, the pressure oil in the parking brake device PB flows in the emergency flow path 80 through the directional solenoid valve 77 and returns to the tank 35 through the directional solenoid valve 84. Consequently, even when the directional solenoid valve 71 is turned ON and the parking brake circuit B24 is driven to supply the pressure oil, the pressure oil in the parking brake device PB can be returned to the tank 35.

As mentioned above, according to the fifth embodiment, the pressure oil can be supplied from the loading pilot circuit B1 to the parking brake circuit B24 through the emergency flow path 80 as in the first embodiment, so the braking state of the parking brake device PB can be released reliably and also the pressure oil in the parking brake device PB can be discharged to the tank 35 through the emergency flow path 80, so the brake can be set to the braking state reliably.

Sixth Embodiment

Figure 17:
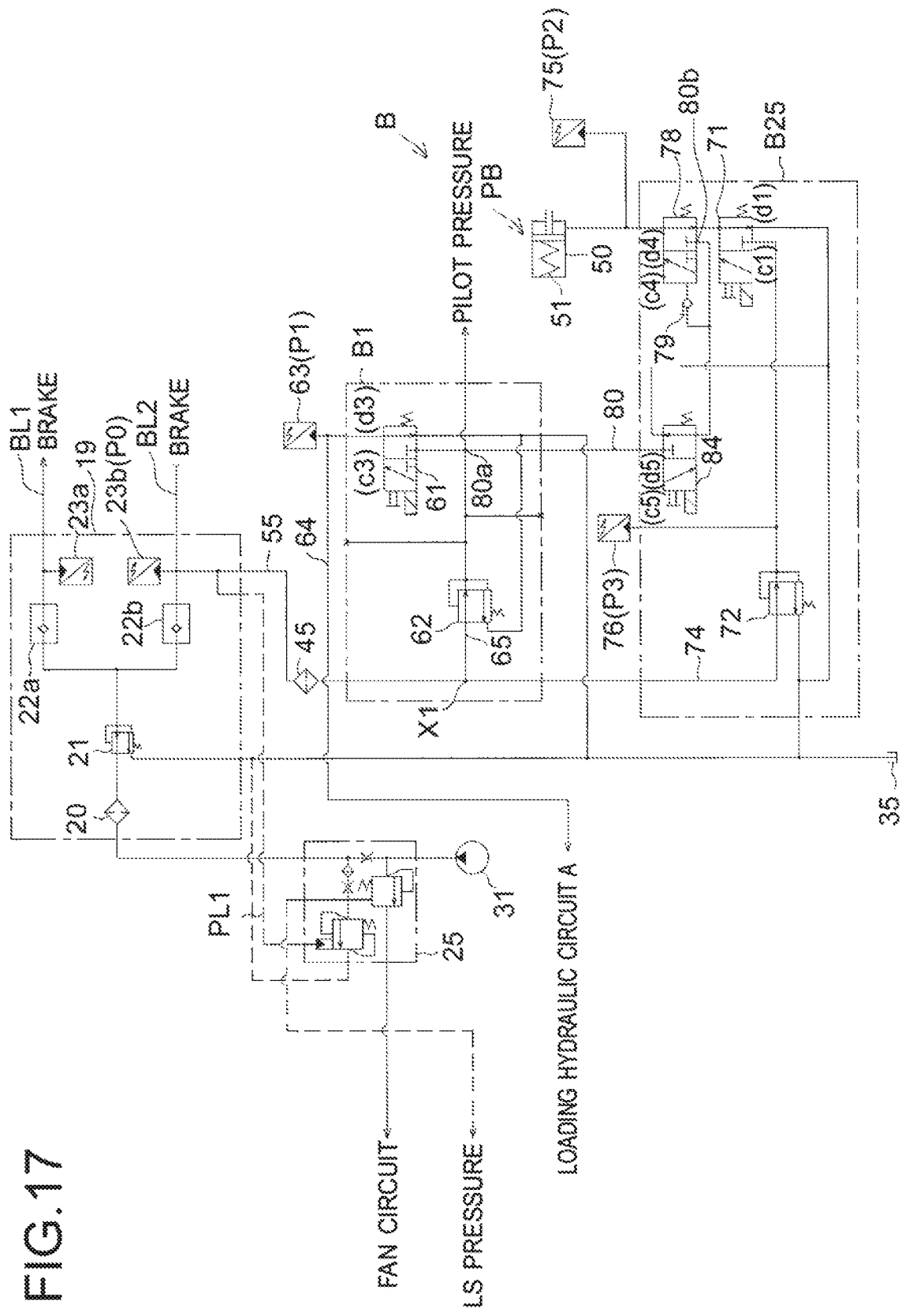
FIG. 17 is a configuration diagram of the parking hydraulic circuit B in the sixth embodiment.

Next, the sixth embodiment of the present invention will be described. FIG. 17 is a configuration diagram of the parking hydraulic circuit B in the sixth embodiment. The sixth embodiment is different from the fifth embodiment in the structure of the parking brake circuit B25 of the parking hydraulic circuit B. Specifically, it is different from the fifth embodiment in that a hydraulic switching valve 78 and a manually operated check valve 79 are provided in place of the directional solenoid valve 77.

The switching valve 78 is structured so that in its normal state, it is held in the position d4 (sixth position) by the spring biasing force, and when the controller 100 turns ON the directional solenoid valve 84 to switch it to the position c5 (third position), the pressure oil from the emergency flow path 80 is applied to the switching valve 78 and the switching valve 78 is switched to the position c4 (fifth position) against the spring biasing force. The switching valve 78, switched to the position c4 (fifth position), is held in the position c4 (fifth position) by the function of the check valve 79 even when the directional solenoid valve 84 is turned OFF. Furthermore, even if the directional solenoid valve 71 malfunctions and fails to be turned OFF, by switching the directional solenoid valve 84 from ON to OFF, the pressure oil in the parking brake device PB can be returned to the tank 35. Therefore, even if the directional solenoid valve 71 malfunctions and fails to be turned OFF, the parking brake device PB can be activated or released by switching the directional solenoid valve 71. The check valve 79 can be returned to the position d4 (sixth position) by operating the manual handle attached to the check valve 79 to open the check valve 79 to discharge the pressure oil applied to the switching valve 78. The sixth embodiment can also bring about the same advantageous effects as the fifth embodiment. Furthermore, since the hydraulic switching valve 78 is used, the controller 100 need not control the switching valve 78. Therefore, the sixth embodiment also offers an advantage that the control burden on the controller 100 can be reduced.

The present invention is not limited to the above embodiments and can be modified in various ways without departing from the gist of the present invention and all the technical matters contained in the technical idea described in the claims are covered by the present invention. The above-mentioned embodiments are preferred examples and those skilled in the art can implement various alternatives, modifications, variations or improvements from the content disclosed in this specification, and these are included in the technical scope described in the appended claims. For example, the loading pilot circuit B1 and the parking brake circuit B2 may be each an independent unit or may constitute one unit. In addition, the present invention can be widely applied to other work vehicles such as forklifts and bulldozers in addition to wheel loaders.

REFERENCE SIGNS LIST

1 . . . wheel loader (work vehicle),
8 . . . lift arm cylinder,
14 . . . engine,
30 . . . main pump (main hydraulic pump),
31 . . . accessory pump (auxiliary hydraulic pump),
32 . . . control valve,
33 . . . control valve,
71 . . . directional solenoid valve,
72 . . . reducing valve,
73 . . . check valve (first check valve),
76 . . . pressure sensor,
79 . . . check valve,
80 . . . emergency flow path,
80a . . . one end of the emergency flow path,
80b . . . the other end of the emergency flow path (first confluence point, second confluence point),
81 . . . directional solenoid valve (emergency directional solenoid valve/valve unit),
83 . . . shuttle valve (valve unit),
84 . . . directional solenoid valve (emergency directional solenoid valve/valve unit),
85 . . . check valve (second check valve),
100 . . . controller,
A . . . loading hydraulic circuit,
B1 . . . loading pilot circuit (loading operation hydraulic circuit),
B2, B21 to B25 . . . parking brake circuit (parking brake releasing hydraulic circuit),
PB . . . parking brake device

The invention claimed is:

1. A work vehicle comprising:
a main hydraulic pump which is driven by an engine;
a lift arm cylinder which extends and retracts by a delivery pressure discharged from the main hydraulic pump;
a control valve which switches a moving direction of the lift arm cylinder;
a loading hydraulic circuit which includes at least the main hydraulic pump, the lift arm cylinder, and the control valve;
an auxiliary hydraulic pump which is provided separately from the main hydraulic pump and driven by the engine;
a negative parking brake device which releases a braking state by supply of pressure oil discharged from the auxiliary hydraulic pump; and
a parking brake releasing hydraulic circuit which supplies the pressure oil discharged from the auxiliary hydraulic pump to the parking brake device,
the vehicle having:
a loading operation hydraulic circuit located upstream of the parking brake releasing hydraulic circuit;
an emergency flow path for supplying the pressure oil discharged from the auxiliary hydraulic pump to the parking brake device through the loading operation hydraulic circuit in an emergency; and
a valve unit which is located in the emergency flow path and can be switched to a communicating position to communicate the emergency flow path or a shutoff position to shut off the emergency flow path,
wherein if pressure in the parking brake releasing hydraulic circuit is lower than a brake release pressure to release the braking state of the parking brake device, the valve unit is switched to the communicating position,
the work vehicle further comprising:
a pressure sensor which detects the pressure in the parking brake releasing hydraulic circuit; and
a controller which controls operation of the valve unit according to a detection signal sent from the pressure sensor,
wherein the valve unit is an emergency directional solenoid valve which is switched to the communicating position or the shutoff position according to a command from the controller, and
the controller switches the emergency directional solenoid valve to the communicating position if the pressure detected by the pressure sensor is lower than the brake release pressure.

2. The work vehicle according to claim 1,
wherein the parking brake releasing hydraulic circuit includes:
a reducing valve for decompressing the pressure oil;
a first check valve which is located between the reducing valve and the parking brake device, allows the pressure oil to flow in a direction from the reducing valve to the parking brake device, and prevents the pressure oil from flowing in a direction opposite to that direction;
a directional solenoid valve which is located between the first check valve and the parking brake device and can be switched between a first position to communicate the pressure oil to an oil chamber in the parking brake device and a second position to communicate the oil chamber in the parking brake device to a tank; and
a first confluence point at which the emergency flow path joins an oil passage between the first check valve and the directional solenoid valve.

3. The work vehicle according to claim 1,
wherein the parking brake releasing hydraulic circuit includes:
a reducing valve for decompressing the pressure oil;
a first check valve which is located between the reducing valve and the parking brake device, allows the pressure oil to flow in a direction from the reducing valve to the parking brake device, and prevents the pressure oil from flowing in a direction opposite to that direction;
a directional solenoid valve which is located between the first check valve and the parking brake device and can be switched between a first position to communicate the pressure oil to an oil chamber in the parking brake device and a second position to communicate the oil chamber in the parking brake device to a tank;
a second confluence point at which the emergency flow path joins an oil passage between the directional solenoid valve and the parking brake device; and
a second check valve which is located between the emergency directional solenoid valve in the emergency flow path and the second confluence point, allows the pressure oil to flow in a direction from the emergency directional solenoid valve to the second confluence point, and prevents the pressure oil from flowing in a direction opposite to that direction.

4. A work vehicle, comprising:
a main hydraulic pump which is driven by an engine;
a lift arm cylinder which extends and retracts by a delivery pressure discharged from the main hydraulic pump;
a control valve which switches a moving direction of the lift arm cylinder;
a loading hydraulic circuit which includes at least the main hydraulic pump, the lift arm cylinder, and the control valve;
an auxiliary hydraulic pump which is provided separately from the main hydraulic pump and driven by the engine;
a negative parking brake device which releases a braking state by supply of pressure oil discharged from the auxiliary hydraulic pump; and
a parking brake releasing hydraulic circuit which supplies the pressure oil discharged from the auxiliary hydraulic pump to the parking brake device,
the vehicle having:
a loading operation hydraulic circuit located upstream of the parking brake releasing hydraulic circuit;
an emergency flow path for supplying the pressure oil discharged from the auxiliary hydraulic pump to the parking brake device through the loading operation hydraulic circuit in an emergency; and
a valve unit which is located in the emergency flow path and can be switched to a communicating position to communicate the emergency flow path or a shutoff position to shut off the emergency flow path,
wherein if pressure in the parking brake releasing hydraulic circuit is lower than a brake release pressure to release the braking state of the parking brake device, the valve unit is switched to the communicating position,
wherein in a case where pressure of pressure oil passed through the loading operation hydraulic circuit is lower than a predetermined threshold and pressure of an oil chamber in the parking brake device reaches a pressure to release the parking brake device, the valve unit is switched to the communicating position so that the pressure oil in the parking brake releasing hydraulic circuit is an operation signal pressure for the loading hydraulic circuit.

* * * * *